(12) United States Patent
Roundtree et al.

(10) Patent No.: US 8,682,298 B2
(45) Date of Patent: Mar. 25, 2014

(54) MESSAGE INTERCEPT METHODS, SUCH AS FOR CUSTOMER SELF-SUPPORT ON A MOBILE DEVICE

(75) Inventors: Brian Roundtree, Kirkland, WA (US); Keldon Rush, Bellingham, WA (US); Kevin Allan, Seattle, WA (US); Linda Beinikis, Seattle, WA (US)

(73) Assignee: Nuance Communications, Inc., Burlington, MA (US)

( * ) Notice: Subject to any disclaimer, the term of this patent is extended or adjusted under 35 U.S.C. 154(b) by 607 days.

(21) Appl. No.: 12/089,690

(22) PCT Filed: Oct. 12, 2006

(86) PCT No.: PCT/US2006/040398
§ 371 (c)(1),
(2), (4) Date: Oct. 21, 2008

(87) PCT Pub. No.: WO2007/044972
PCT Pub. Date: Apr. 19, 2007

(65) Prior Publication Data
US 2009/0124271 A1    May 14, 2009

Related U.S. Application Data

(60) Provisional application No. 60/726,107, filed on Oct. 12, 2005.

(51) Int. Cl.
*H04M 3/42* (2006.01)
(52) U.S. Cl.
USPC .............. 455/414.1; 455/414.2; 455/466; 455/550.1; 455/415; 455/422.1

(58) Field of Classification Search
USPC .............. 455/414.1, 414.2, 466, 550.1, 415, 455/422.1
See application file for complete search history.

(56) References Cited

U.S. PATENT DOCUMENTS 5,422,656 A    6/1995 Allard et al.
5,475,735 A    12/1995 Williams et al.
(Continued)

FOREIGN PATENT DOCUMENTS

CA    2454334 A1    2/2003
CN    1283341 A     2/2001
(Continued)

OTHER PUBLICATIONS

International Search Report for International Application No. PCT/US06/40398, dated Jul. 15, 2008, Applicant SNAPin Software Inc.
(Continued)

*Primary Examiner* — Nghi H Ly
(74) *Attorney, Agent, or Firm* — Perkins Coie LLP

(57) ABSTRACT

A method for intercepting messages includes determining that a mobile device user has initiated a message for transmission across a wireless network to an electronic address that corresponds to a predetermined address (such as a customer support address). The message may be a text message, an email message, an instant message, an SMS message, and/or an MMS message. The method also includes preventing transmission of the initiated message and performing at least one action at the mobile device. Examples of the at least one action include invoking a bot to interact with the mobile device user and displaying a list of potential solutions to the subscriber's problem. Systems, computer-readable media, and various other features and embodiments are disclosed.

28 Claims, 36 Drawing Sheets

(56) References Cited

U.S. PATENT DOCUMENTS

| | | | |
|---|---|---|---|
| 5,638,369 A * | 6/1997 | Ayerst et al. | 370/346 |
| 5,675,628 A | 10/1997 | Hokkanen | |
| 5,790,798 A | 8/1998 | Beckett, II et al. | |
| 5,831,598 A | 11/1998 | Kauffert et al. | |
| 5,845,211 A | 12/1998 | Roach, Jr. | |
| 6,031,467 A | 2/2000 | Hymel et al. | |
| 6,151,507 A | 11/2000 | Laiho et al. | |
| 6,199,045 B1 | 3/2001 | Giniger et al. | |
| 6,219,047 B1 | 4/2001 | Bell | |
| 6,245,756 B1 | 6/2001 | Patchev et al. | |
| 6,246,756 B1 | 6/2001 | Borland | |
| 6,301,480 B1 | 10/2001 | Kennedy, III et al. | |
| 6,368,205 B1 | 4/2002 | Frank et al. | |
| 6,370,399 B1 | 4/2002 | Phillips | |
| 6,389,278 B1 | 5/2002 | Singh | |
| 6,424,945 B1 | 7/2002 | Sorsa et al. | |
| 6,430,252 B2 | 8/2002 | Reinwand et al. | |
| 6,430,407 B1 | 8/2002 | Turtiainen | |
| 6,496,979 B1 | 12/2002 | Chen et al. | |
| 6,615,038 B1 | 9/2003 | Moles et al. | |
| 6,618,478 B1 | 9/2003 | Stuckman et al. | |
| 6,646,570 B1 | 11/2003 | Yamada et al. | |
| 6,654,594 B1 | 11/2003 | Hughes et al. | |
| 6,668,169 B2 | 12/2003 | Burgan et al. | |
| 6,720,864 B1 * | 4/2004 | Wong et al. | 340/7.52 |
| 6,748,211 B1 | 6/2004 | Isaac et al. | |
| 6,766,017 B1 | 7/2004 | Yang et al. | |
| 6,792,280 B1 | 9/2004 | Hori et al. | |
| 6,819,932 B2 * | 11/2004 | Allison et al. | 455/466 |
| 6,909,910 B2 | 6/2005 | Pappalardo et al. | |
| 6,922,721 B1 | 7/2005 | Minborg et al. | |
| 6,931,258 B1 | 8/2005 | Jarnstrom et al. | |
| 6,940,844 B2 | 9/2005 | Purkayastha et al. | |
| 6,944,447 B2 | 9/2005 | Portman et al. | |
| 6,970,698 B2 | 11/2005 | Majmundar et al. | |
| 7,177,665 B2 | 2/2007 | Ishigaki et al. | |
| 7,190,960 B2 * | 3/2007 | Wilson et al. | 455/456.1 |
| 7,194,257 B2 | 3/2007 | House et al. | |
| 7,209,964 B2 | 4/2007 | Dugan et al. | |
| 7,236,166 B2 | 6/2007 | Zinniel et al. | |
| 7,308,497 B2 | 12/2007 | Louviere et al. | |
| 7,353,016 B2 | 4/2008 | Roundtree et al. | |
| 7,359,706 B2 | 4/2008 | Zhao | |
| 7,376,414 B2 | 5/2008 | Engstrom | |
| 7,539,484 B2 | 5/2009 | Roundtree | |
| 7,899,915 B2 | 3/2011 | Reisman | |
| 2001/0014615 A1 | 8/2001 | Dahm et al. | |
| 2002/0034940 A1 | 3/2002 | Takae et al. | |
| 2002/0065109 A1 | 5/2002 | Mansikkaniemi et al. | |
| 2002/0112172 A1 | 8/2002 | Simmons | |
| 2002/0115476 A1 | 8/2002 | Padawer | |
| 2002/0123368 A1 | 9/2002 | Yamadera et al. | |
| 2002/0128036 A1 | 9/2002 | Yach et al. | |
| 2002/0152229 A1 | 10/2002 | Peng | |
| 2002/0155476 A1 | 10/2002 | Pourmand et al. | |
| 2003/0013483 A1 | 1/2003 | Ausems et al. | |
| 2003/0039948 A1 | 2/2003 | Donahue | |
| 2003/0053615 A1 | 3/2003 | Anderson et al. | |
| 2003/0112931 A1 | 6/2003 | Brown et al. | |
| 2003/0187650 A1 | 10/2003 | Moore et al. | |
| 2003/0204725 A1 | 10/2003 | Itoi et al. | |
| 2003/0233461 A1 | 12/2003 | Mariblanca-Nieves et al. | |
| 2004/0005051 A1 | 1/2004 | Wheeler et al. | |
| 2004/0132431 A1 | 7/2004 | Vandermeijden et al. | |
| 2004/0142720 A1 | 7/2004 | Smethers | |
| 2004/0171375 A1 | 9/2004 | Chow-Toun | |
| 2004/0172561 A1 | 9/2004 | Iga | |
| 2004/0193444 A1 | 9/2004 | Hufford et al. | |
| 2004/0198316 A1 | 10/2004 | Johnson | |
| 2004/0203959 A1 * | 10/2004 | Coombes | 455/466 |
| 2005/0266798 A1 * | 12/2005 | Moloney et al. | 455/41.2 |
| 2006/0003758 A1 | 1/2006 | Bishop et al. | |
| 2006/0047830 A1 * | 3/2006 | Nair et al. | 709/229 |
| 2006/0158436 A1 | 7/2006 | LaPointe | |
| 2006/0168303 A1 | 7/2006 | Oyama et al. | |
| 2006/0229054 A1 * | 10/2006 | Erola et al. | 455/403 |
| 2006/0245391 A1 | 11/2006 | Vaidya et al. | |
| 2006/0274869 A1 | 12/2006 | Morse | |
| 2007/0019563 A1 | 1/2007 | Ramachandran et al. | |
| 2007/0061243 A1 | 3/2007 | Ramer | |
| 2007/0064743 A1 | 3/2007 | Bettis et al. | |
| 2007/0173237 A1 | 7/2007 | Roundtree | |
| 2007/0207795 A1 | 9/2007 | Roundtree | |
| 2007/0293199 A1 | 12/2007 | Roundtree et al. | |
| 2007/0293200 A1 | 12/2007 | Roundtree et al. | |
| 2008/0189550 A1 | 8/2008 | Roundtree | |
| 2008/0194296 A1 | 8/2008 | Roundtree | |
| 2008/0256447 A1 | 10/2008 | Roundtree | |
| 2008/0280588 A1 | 11/2008 | Roundtree et al. | |

FOREIGN PATENT DOCUMENTS

| | | |
|---|---|---|
| CN | 2478292 | 2/2002 |
| CN | 1361995 A | 7/2002 |
| CN | 1611087 | 4/2005 |
| EP | 1387241 | 2/2004 |
| GB | 2340344 | 2/2000 |
| GB | 2365711 | 2/2002 |
| JP | 62072058 A | 4/1987 |
| JP | 07-203536 A | 8/1995 |
| JP | 09-507986 T | 8/1997 |
| JP | 10084404 | 3/1998 |
| JP | 11259199 | 9/1999 |
| JP | 2000348022 A | 12/2000 |
| JP | 2002-135848 A | 5/2002 |
| JP | 200305880 | 1/2003 |
| JP | 2003067334 | 3/2003 |
| JP | 2003108182 A | 4/2003 |
| JP | 2003-188982 A | 7/2003 |
| JP | 2003186590 A | 7/2003 |
| JP | 2003-280803 A | 10/2003 |
| JP | 2003-303172 A | 10/2003 |
| JP | 2003-308148 A | 10/2003 |
| JP | 2003-309880 A | 10/2003 |
| JP | 2004021580 | 1/2004 |
| JP | 2004-048790 A | 2/2004 |
| JP | 2005110063 A | 4/2005 |
| JP | 2005167463 A | 6/2005 |
| KR | 200344337 | 6/2003 |
| WO | WO-9707641 | 2/1997 |
| WO | WO-0070888 | 11/2000 |
| WO | WO-0186472 | 11/2001 |
| WO | WO-2005081852 A2 | 9/2005 |
| WO | WO-2005083996 A1 | 9/2005 |
| WO | WO-2007002499 A2 | 1/2007 |
| WO | WO-2007044972 A2 | 4/2007 |
| WO | WO-2007070837 A2 | 6/2007 |
| WO | WO-2007092908 A2 | 8/2007 |
| WO | WO-2008042989 A2 | 4/2008 |
| WO | WO-2008086320 A1 | 7/2008 |
| WO | WO-2008128119 A1 | 10/2008 |

OTHER PUBLICATIONS

European Search Report for European Application No. 05713762.2, dated Jun. 27, 2008, Applicant SNAPin Software Inc.
International Search Report for International Application No. PCT/US06/24637, dated Aug. 1, 2007, Applicant SNAPin Software Inc.
International Search Report for International Application No. PCT/US07/61806, dated Jul. 13, 2008, Applicant SNAPin Software Inc.
International Search Report for International Application No. PCT/US08/50447, dated Apr. 10, 2008, Applicant SNAPin Software Inc.
Japanese Office Action dated Jun. 16, 2008 under Japanese Patent Application 2006-554217, 10 pages.
U.S. NonFinal Office Action dated Jul. 23, 2008 under U.S. Appl. No. 11/672,499, 11 pages.
U.S. Appl. No. 11/917,323, filed Dec. 12, 2007, Roundtree et al.
U.S. Appl. No. 12/370,524, filed Feb. 12, 2009, Roundtree.
U.S. Appl. No. 12/444,332, filed Apr. 3, 2009, Roundtree.
U.S. Appl. No. 12/446,221, filed Apr. 17, 2009, Roundtree.
U.S. Appl. No. 12/521,989, filed Jul. 1, 2009, Roundtree.
U.S. Appl. No. 12/522,901, filed Jul. 10, 2009, Roundtree.

(56) References Cited

OTHER PUBLICATIONS

3rd Generation Partnership Project. "Specification of the SIM Application Toolkit for the Subscriber Identity Module—MobileEquipment (SIM-ME) Interface (Release 1999)," 3GPP Organizational Partners, 2004, 143 pages.

Center for Customer Driven Quality at Purdue University, "It's the Solution, Stupid," 2004, 2 pages.

Gartner, "Contact Center Investment Strategy and Leading Edge Technologies," http://www.gartner.com/4_decision_tools/measurement/measure_it_articles/2002_12/contact_center_investment_strategy.jsp, accessed on Jul. 8, 2008, 4 pages.

U.S. Appl. No. 12/595,803, filed Oct. 13, 2009, Roundtree et al.

U.S. Appl. No. 12/720,624, filed Mar. 9, 2010, Roundtree et al.

SNAPin Software Inc., "SNAPin White Paper: The Service Experience Opportunity," <http://www.snapin.com>, 2005, 16 pages.

Supplementary European Search Report for European Patent Application No. 06840247.8, Mai! Date Feb. 2, 2012, 8 pages.

\* cited by examiner

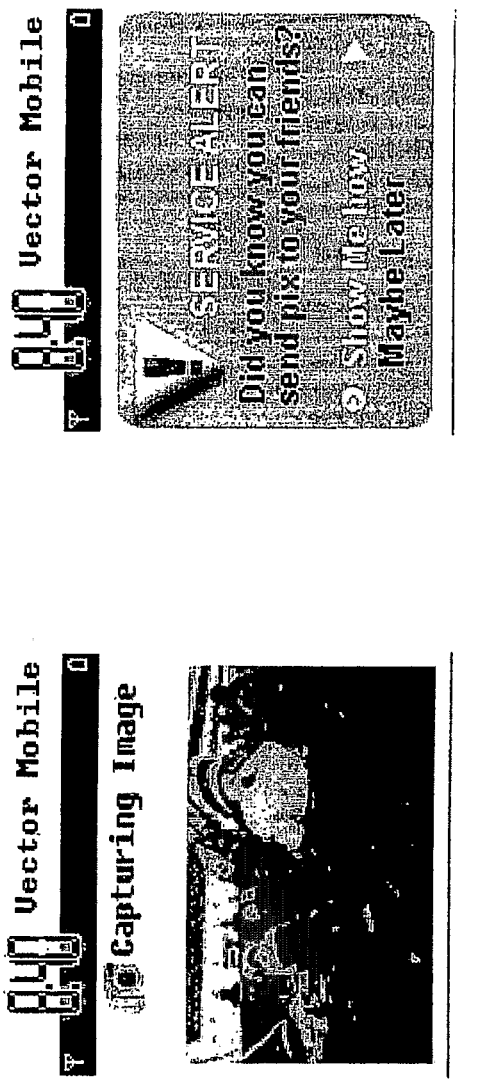

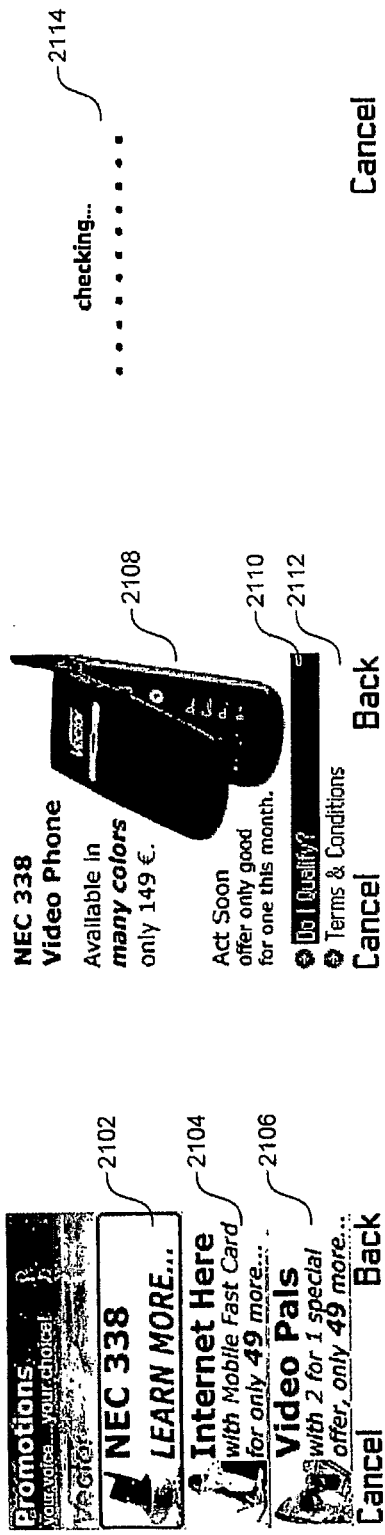

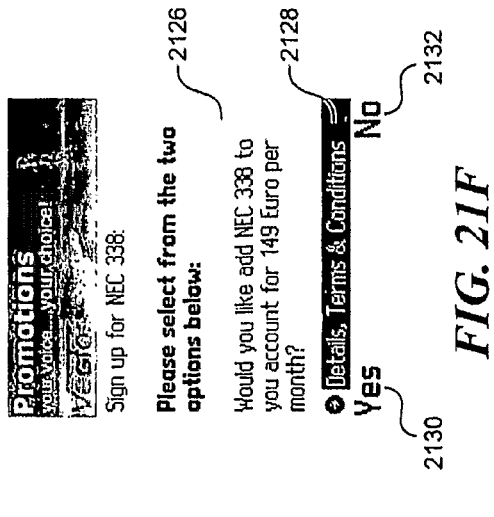
FIG. 21F
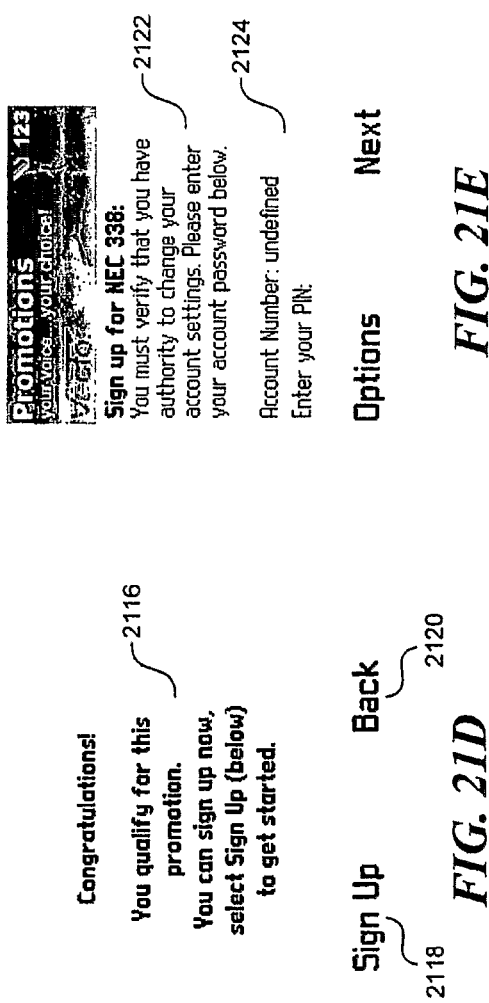
FIG. 21E
FIG. 21D

MESSAGE INTERCEPT METHODS, SUCH AS FOR CUSTOMER SELF-SUPPORT ON A MOBILE DEVICE

CROSS-REFERENCE TO RELATED APPLICATION(S)

This application is a U.S. National Phase of PCT/US2006/040398 filed Oct. 12, 2006, which claims the benefit of U.S. Provisional Patent Application No. 60/726,107, filed Oct. 12, 2005, entitled CALL INTERCEPT METHODS, SUCH AS FOR CUSTOMER SELF-SUPPORT ON A MOBILE DEVICE. This application is also related to U.S. patent application Ser. No. 11/063,663, filed Feb. 2, 2005, entitled CALL INTERCEPT METHODS, SUCH AS FOR CUSTOMER SELF-SUPPORT ON A MOBILE DEVICE, all of which are incorporated by reference in their entirety.

BACKGROUND

Current methods for handling customer self-support calls often require a call to a call center and retrieval of data from a network. For example, a subscriber may dial from their mobile device a customer support number, such as "611" or "133." Once the subscriber dials the customer support number, an automated system may answer the call and provide the subscriber with a menu of options. The subscriber selects options from the menu by pressing buttons on the mobile device or through voice recognition software. Once the subscriber requests data by selecting an option, the automated system retrieves the data from a network and delivers the data to the subscriber over the mobile device. Alternatively, a third party application, such as PocketThis, may independently provide content from the network to a mobile device via SMS (Short Message Service) or WAP (Wireless Application Protocol) push.

Problems are associated with current implementations of customer self-support for mobile devices. Existing systems rely on the use of an external network to provide data to the subscriber. The use of an external network for customer self-support can consume a large amount of bandwidth, congest the network, provide for slower customer response times, and lead to increased costs for the mobile device carrier. In addition, the use of an automated system with multiple options can result in longer call wait times, increased call costs for the mobile carrier and customer, and lost customers due to the longer call wait times.

BRIEF DESCRIPTION OF THE DRAWINGS

FIGS. 12A and 12B illustrate context-sensitive assistance based on events.

FIGS. 21A through 21F illustrate a method for locally verifying on the mobile device if a subscriber is eligible for an advertised promotion.

Figure 1:
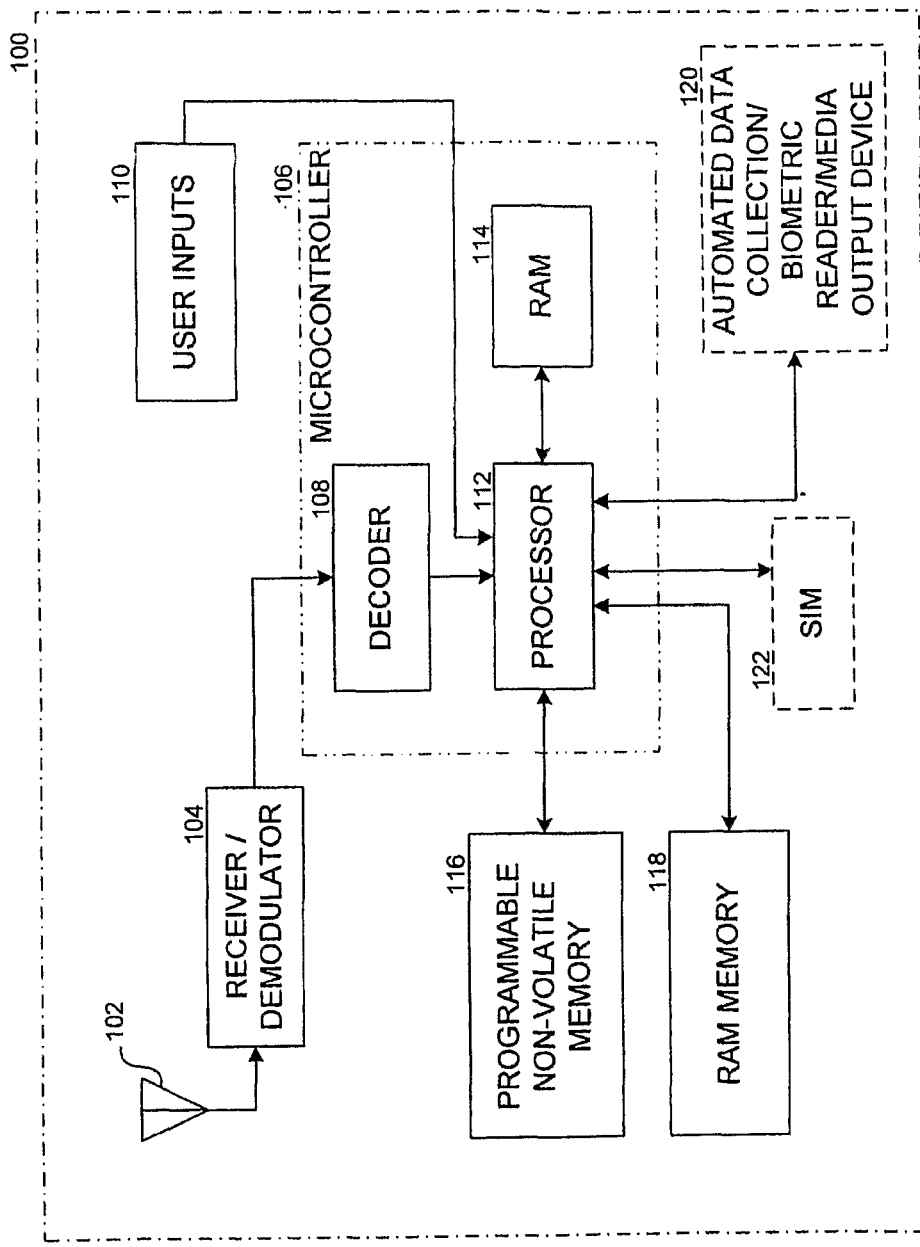
FIG. 1 is a schematic diagram illustrating a mobile device on which call intercept methods and customer self-support can be implemented.

The headings provided herein are for convenience only and do not necessarily affect the scope or meaning of the claimed invention.

In the drawings, the same reference numbers and acronyms identify elements or acts with the same or similar functionality for ease of understanding and convenience. To easily identify the discussion of any particular element or act, the most significant digit or digits in a reference number refer to the Figure number in which that element is first introduced (e.g., element 1104 is first introduced and discussed with respect to FIG. 11).

A portion of this disclosure contains material to which a claim for copyright is made. The copyright owner has no objection to the facsimile reproduction by anyone of the patent document or patent disclosure (including the Figures) as it appears in the Patent and Trademark Office patent file or records, but the copyright owner reserves all other copyright rights whatsoever.

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

It is intended that the terminology used in the description presented below be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

A method for locally intercepting calls from a mobile device for providing enhanced services such as customer self-support is disclosed. Subscribers may dial one or more predetermined numbers on their respective mobile device. Software on the mobile device determines whether the number corresponds to one of the predetermined numbers (such as a customer support number). The phone provides information to the subscriber, and may intercept the call when the number is dialed, after the call has gone through, while the call is on hold, etc. For example, if the number dialed matches a customer support service number, then the mobile device may interrupt the attempted call and display a list of potential solutions to the subscriber's problems on the mobile device. The list of potential solutions may be stored locally on the mobile device itself and not on the network. Each solution can be a combination of step by step procedures for the subscriber to perform, information and graphics, multiple executables that access and alter data on the phone, multiple executables that access and alter data on the carrier network or on a remote Internet server, or others.

FIG. 1 illustrates a mobile device 100 on which call intercept methods and customer self-support can be implemented in accordance with several embodiments of the invention. A receiver/demodulator 104 receives a transmitted signal via an antenna 102 and reconstructs the original transmitted signal. The transmitted signal is sent to a microcontroller 106, which consists of a decoder 108, a processor 112, and RAM (Random Access Memory) 114. The decoder 108 translates the signals into meaningful data and interfaces to other devices. Decoded data, along with subscriber inputs 110, are sent to the processor 112. In addition, the mobile device may include optional components, such as an automated data collection 120 unit linked to the processor 112, which can include an automated RFID (Radio Frequency Identification) tag reader, a magnetic card swipe reader, a bar code reader, and others. Additionally, or alternatively, the mobile device may include a biometric reader (e.g., thumbprint reader, voice fingerprint recognition functionality, etc.), and/or a media output device (e.g., MP3 player, television tuner/player, etc.) 120. The mobile device may also include a subscriber identity module (SIM) 122. The output of the processor 112 can be stored in a programmable non-volatile memory 116 or in the RAM memory 118.

Figure 2:
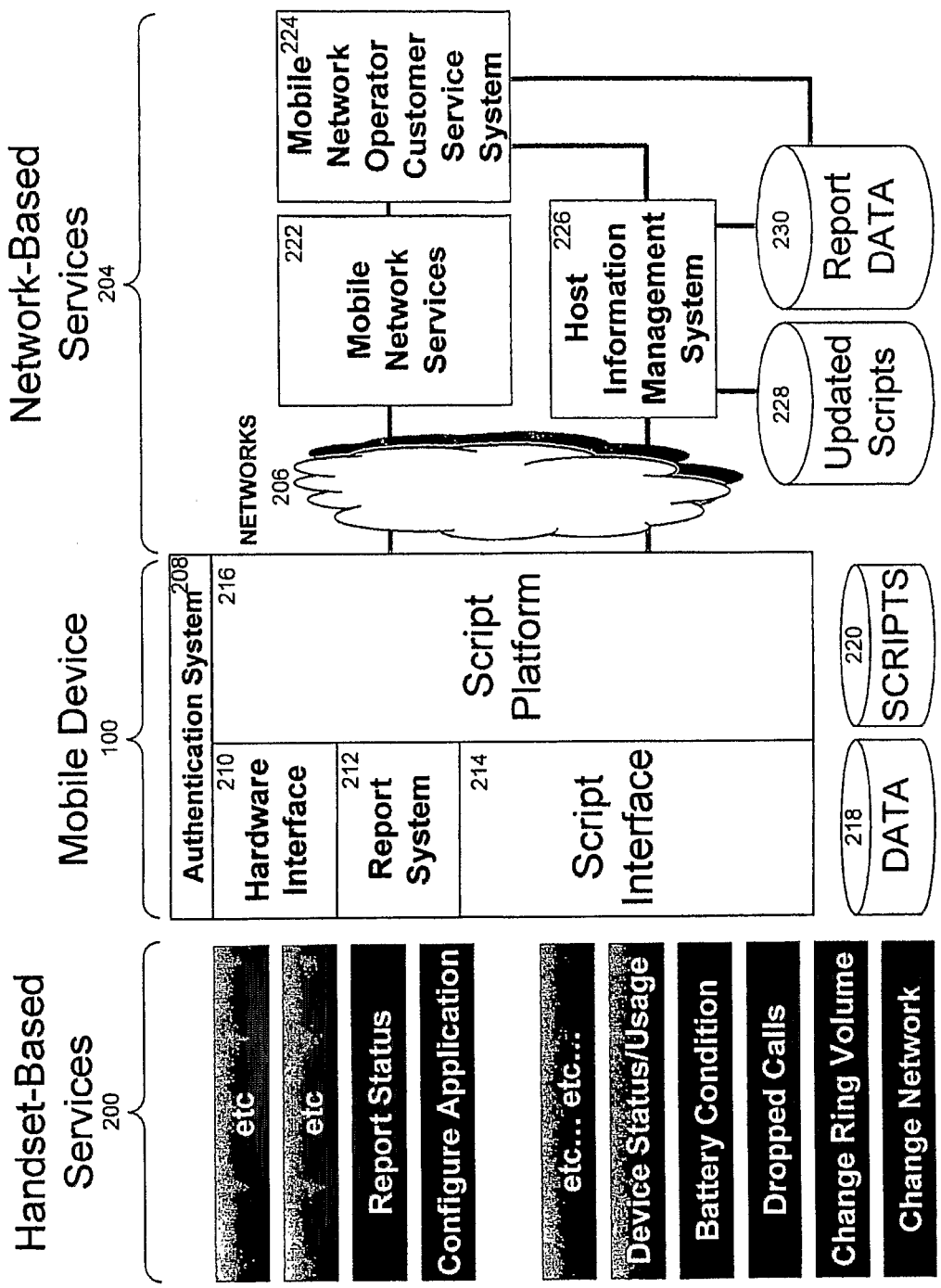
FIG. 2 is a schematic diagram illustrating a system architecture for implementing call intercept methods and customer self-support.

FIG. 2 illustrates a system architecture for implementing call intercept methods and customer self-support. The system architecture includes three components: handset-based services 200, the mobile device 100, and network-based services 204. FIG. 1 and the discussion herein provide a brief, general description of a suitable telecommunications or computing environment in which the invention can be implemented. Although not required, aspects of the invention are described in the general context of computer-executable instructions, such as routines executed by a general-purpose computer, e.g., mobile device, a server computer, or personal computer. Those skilled in the relevant art will appreciate that the invention can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the invention can be embodied in a special purpose computing device or data processor that is specifically programmed, configured, or constructed to perform one or more of the computer-executable instructions explained in detail herein. Aspects of the invention may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the invention reside on a server computer, while corresponding portions reside on a client computer such as a mobile or portable device, and thus, while certain hardware platforms are described herein, aspects of the invention are equally applicable to nodes on a network. In an alternative embodiment, the mobile device or portable device may represent the server portion, while the server may represent the client portion.

The handset-based services 200 may include executable software, software configurations, hardware configurations and controls, and handset operating system interfaces. As disclosed herein, executable software may include, without limitation, any software program stored on the mobile device or associated memory device, both permanently and temporarily connected via hardware or wireless connectivity. The mobile device 100 may include an authentication system 208 (e.g., via a SIM), a hardware interface 210, a report system 212, a script interface 214, a script platform 216, data 218, and scripts 220. The network-based services 204 may include a network or networks 206, mobile network services 222, a mobile network operator customer service system 224, a host information management system 226, updated scripts 228, and report data 230. The components of the mobile device 100 and the network-based services 204 will be described below.

The components within the mobile device 100 allow the device to integrate both handset-based services 200 and network-based services 204. The authentication system 208 can implement SIM (Subscriber Identity Module) card-based or standalone authentication to meet network requirements for desired levels of security. Authenticating a system to meet network requirements may not be required but is often recommended.

The hardware interface 210 may retrieve hardware interface elements required for interfacing with network or phone-based customer support services. Examples of hardware interface elements include changing volume, changing frequency, retrieving SIM (Subscriber Identity Module) ID, connection status from the SIM or radio hardware, and others. The report system 212 may collect and forward the data reported by the mobile device to the network 206. The report system 212 can also encrypt the handset identification information to provide increased security. The information can be encoded so that only the host information management system 226 can decipher the handset identification information.

The script interface 214 serves as a standard application programming interface for customer support services. More specifically, the script interface 214 provides an interface between scripts 220 and the various hardware-specific and executable, program-specific functions. The script interface 214 allows a single customer service script to be deployed across multiple operating systems and hardware configurations. In addition, the script interface 214 includes a standard API (Application Programming Interface) for both the hardware/OS side and the script interface.

The script platform 216 can mix and match calls through the script interface to acquire information, to change or correct settings on the phone, and to perform additional functions as described below. The script platform 216 authenticates, runs, and updates all scripts 220, manages reporting updates and changes, communicates with the host information management system 226, communicates with the GUI (Graphical User Interface), and manages customer surveys and interviews. The host information management system 226 can push a notification to the script platform 216 via USSD (Unstructured Supplementary Services Data), SMS (Short Message Service), IP (Internet Protocol), or any other network connectivity that the mobile device supports. The script platform 216 can run the scripts 220 after authentication, and the scripts 220 can be authenticated to the network 206 or to the phone.

The components within the network-based services 204 allow the mobile device 100 to communicate with and to retrieve data from the network 206. The network-based services 204 may include wired and wireless systems. The mobile network services 222 may consist of one or more systems including billing, CRM (Customer Relationship Management), provisioning, and others. Furthermore, mobile network services 222 are able to return data calls made by mobile devices via standard network protocols (e.g., IP, DTMF (Dual-Tone Multi-Frequency), SMS, USSD, etc.).

The mobile network operator customer service system 224 may also consist of one or more systems relating to customer service, including billing, CRM, provisioning, and others. The host information management system 226 controls interactions between the mobile device and the host customer support system. The host information management system 226 can transmit updates to the mobile device. The mobile device typically employs a unique handset ID or serial number, and a mobile phone number. The report data 230 provides storage for report information gathered from the mobile device. The updated scripts 228 consist of scripts that the host customer support system provides to the mobile device. The updated scripts 228 can be managed and versioned as desired by the host information management system 226, can be targeted at specific subscribers or groups of subscribers, and can include requests for reports and customer interview surveys.

Figure 3:
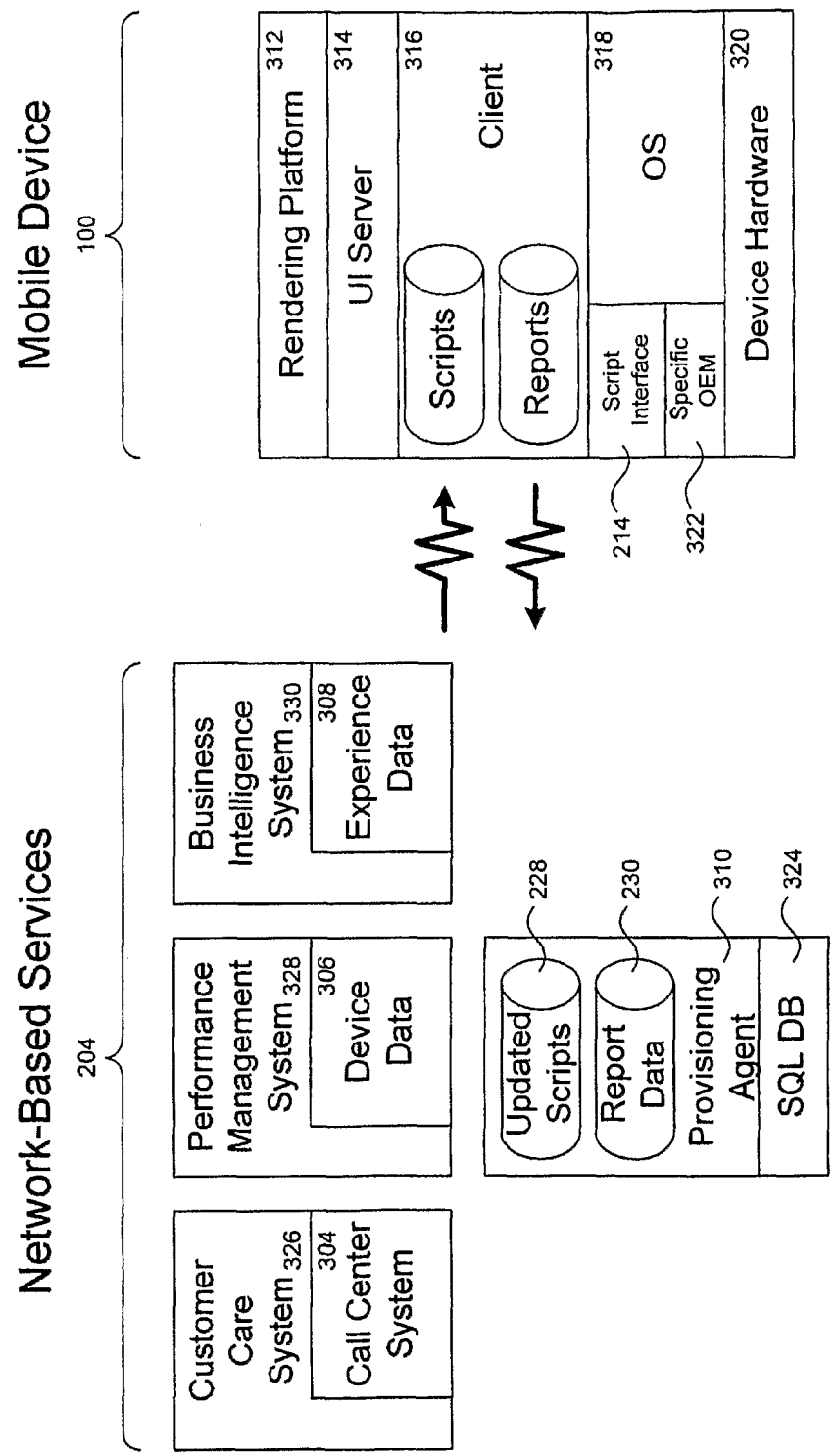
FIG. 3 is a schematic diagram illustrating a system architecture for the network-based services and the mobile device of FIG. 2.

FIG. 3 illustrates a system architecture for the network-based services 204 and the mobile device 100. The network-based services 204 include a call center system 304, device data 306, subscriber experience data 308, and a provisioning agent 310. The call center system 304 may be part of a customer care system 326, the device data 306 may be part of a performance management system 328, and the subscriber experience data 308 may be part of a business intelligence system 330. The call center system 304 can manage settings remotely and can collect data OTA (over the air) from the mobile device 100 without asking the subscriber for permission. The call center system 304 can also automatically collect device data (e.g., handset ID and mobile phone number) 306 and subscriber experience data (e.g., the nature of the customer service problems) 308 from the mobile device 100. The device data 306 and the subscriber experience data 308 may be integrated into network-based services or used standalone.

The provisioning agent 310 interacts with the updated scripts 228 and report data 230. The provisioning agent collects report data 230 associated with the device data 306 and subscriber experience data 308 from the mobile device 100. The provisioning agent also corrects subscriber problems in real-time by transmitting appropriate scripts to the mobile device 100. The transmission of scripts to, and the collection of data from, the mobile device 100 may be hosted within the network or externally. In addition, the updated scripts 228 and the report data 306 may be stored in an SQL (Structured Query Language) database 324.

The mobile device 100 may include a rendering platform 312 (e.g., implemented in C++), an optional UI (User Interface) server 314, a client 316, and a script interface 214. The client 316 generates reports containing subscriber data and transmits the reports to the network-based services 204. The client 316 receives scripts 320 from the network-based services 204 that can correct subscriber problems. The script interface 214 allows a single script to be executed by multiple operating systems and hardware configurations. In addition, the mobile device 100 may also include an OS (Operating System) 318, specific OEM (Original Equipment Manufacturer) 322, and device hardware 320. In general, the mobile device scripts or applications may be customized via a European Computer Manufacture's Association (ECMA) compliant scripting language such as JavaScript. Such software can be installed by the manufacturer, or after manufacturing, such as over the air, particularly with open OS-based devices. For proprietary OS-based devices, a small kernel can be installed at the time of manufacturing or flashed onto the device at a later time, and then the full client application can be installed on the mobile device over the air.

As explained herein, the scripts or software applications on the mobile device provide for at least four processes: providing customer care to a subscriber on the mobile device by intercepting calls; diagnostic tools to allow customer service representatives to remotely execute diagnostics and commands on the mobile device, with proactive tool to correct problems for subscribers on the mobile device; collecting and summarizing data and other metrics with respect to mobile devices; and, guides to train subscribers when they need it most, such as the first time they attempt to use an application.

Figure 4:
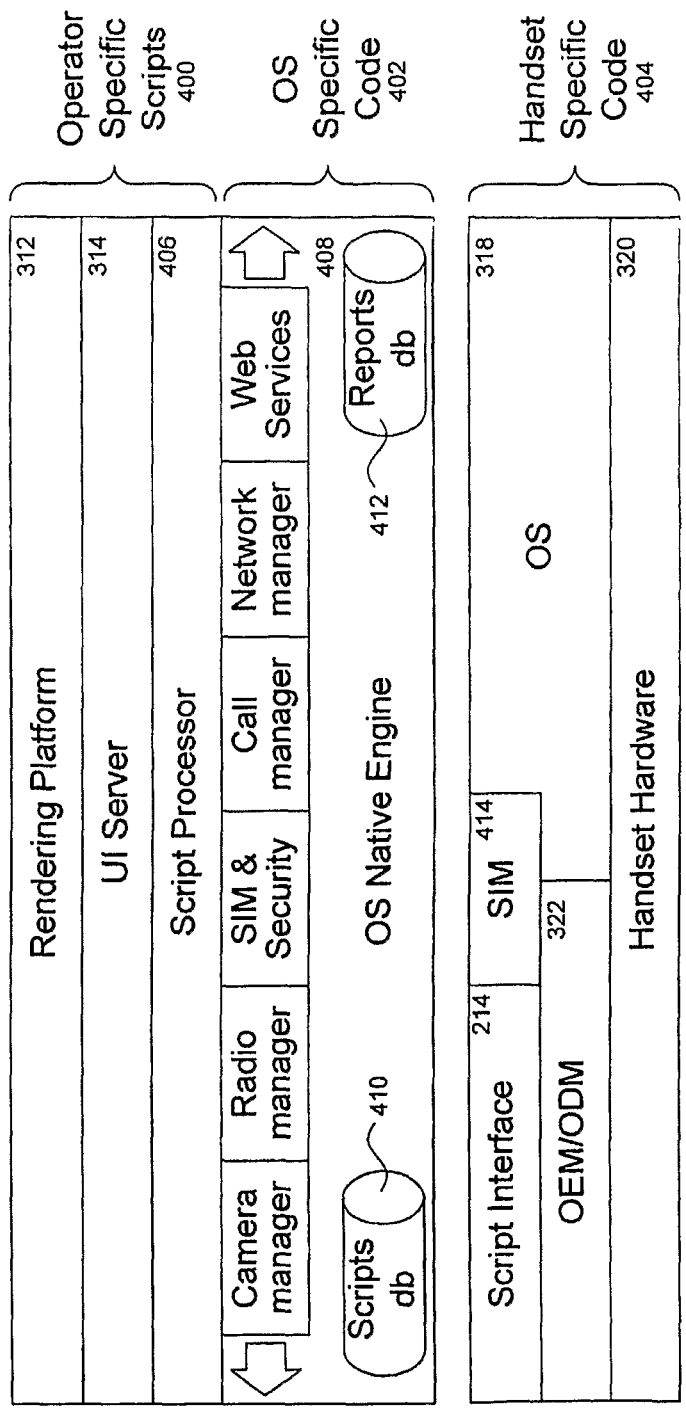
FIG. 4 is a schematic diagram illustrating the architecture for the mobile device of FIG. 1.

FIG. 4 illustrates the architecture for the mobile device 100. The rendering platform 312, the UI server 314, and a script processor 406 handle or are involved in handling operator specific scripts 400. Operator specific scripts 400 may include scripts pertaining to billing information, bill payment, forwarding calls, setting up an online photo album, and others, including those specific to a wireless service provider (such as those providing a preferred user interface). The OS native engine 408, which includes a scripts database 410 and a reports database 412, utilizes OS specific code 402. The script interface 214 utilizes handset specific code 404. Handset specific code 404 may also be applied to a SIM 414, an OS 318, specific OEM 322, and handset hardware 320.

Figure 5:
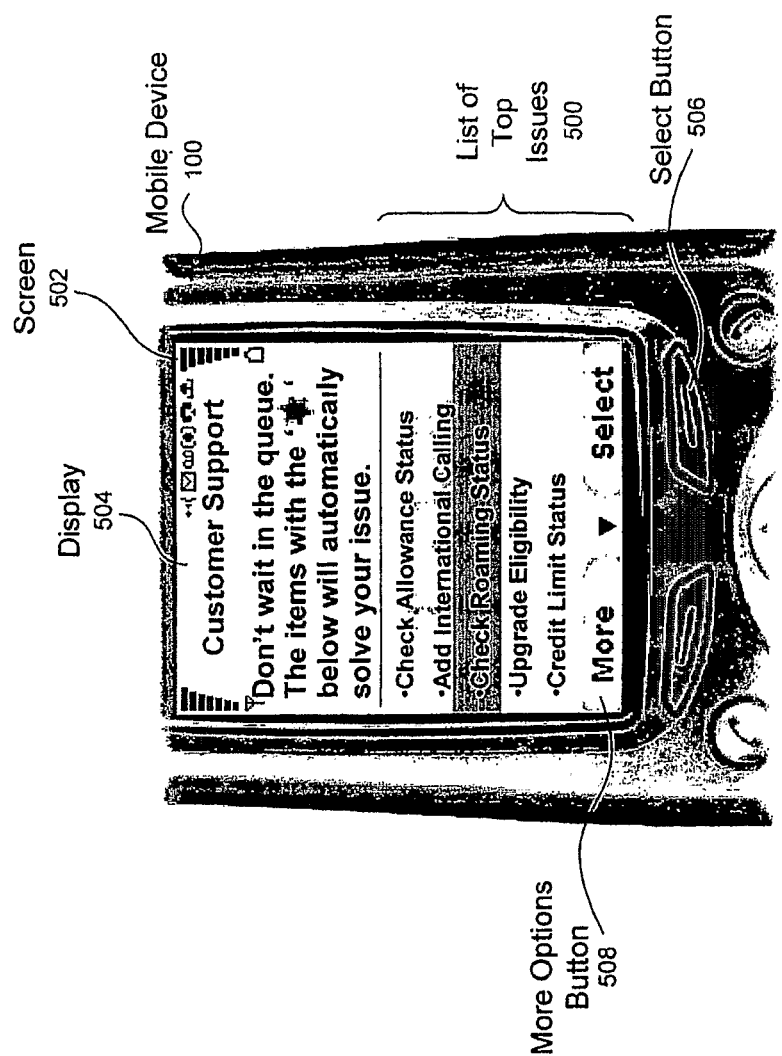
FIG. 5 is a diagram illustrating a display on the mobile device for locally providing customer support.

FIG. 5 illustrates a display 504 on the mobile device 100 for locally providing customer support. Referring to FIG. 5 (and other screen displays), representative phone or computer displays, or web pages, are shown for performing certain tasks described herein. The screens provide facilities to receive input data, such as a form with field(s) to be filled in, menu selections, pull-down menus or entries allowing one or more of several options to be selected, buttons, sliders, hypertext links or other known user interface tools for receiving user input. While certain ways of displaying information to users is shown and described with respect to certain Figures, those skilled in the relevant art will recognize that various other alternatives may be employed. The terms "screen," "web page" and "page" are generally used interchangeably herein.

The screens may be stored as display descriptions, graphical user interfaces, or other methods of depicting information on a computer screen (e.g., commands, links, fonts, colors, layout, sizes and relative positions, and the like), where the layout and information or content to be displayed on the page is stored in a database. In general, a "link" refers to any resource locator identifying a resource on a network, such as a display description provided by an organization having a site or node on the network. A "display description," as generally used herein, refers to any method of automatically displaying information on a computer screen in any of the above-noted formats, as well as other formats, such as email or character/code-based formats, algorithm-based formats (e.g., vector generated), Flash format, or matrix or bit-mapped formats.

A subscriber may access the display 504 on a screen 502 by dialing a customer support number, such as "611." The display 504 automatically provides the subscriber with a list of top issues or questions 500, which may answer common customer support questions. Subscribers can scroll down on the display 504 using a more options button 508 to view additional issues. Subscribers can select an issue from the list using a select button 506. Selecting an issue allows the mobile device 100 to retrieve relevant data from the local, programmable non-volatile memory 116.

Figure 6A:
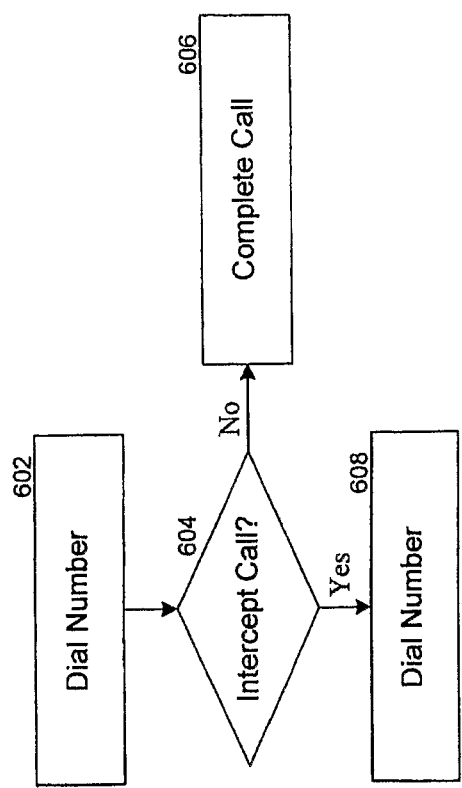
FIG. 6A is a flow diagram illustrating a basic routine for intercepting and redirecting a customer service support call at the mobile device.

FIG. 6A illustrates the basic routine for intercepting and redirecting a customer service support call at the mobile device. In block 602, a subscriber dials a customer service support number, such as "611," to access a customer support call center. The subscriber's mobile device determines locally if the number dialed matches a number stored on the mobile device (block 604). If the number matches, then the mobile device locally intercepts the customer service support call at the mobile device and performs actions at the mobile device (block 608), as described below. In one embodiment, the mobile device may intercept the incoming call and display locally stored content (e.g., series of help screens), or launch a browser to a predetermined webpage via a network connection. If the number does not match, then the mobile device allows the call to be completed to a call center (block 606).

Figure 6B:
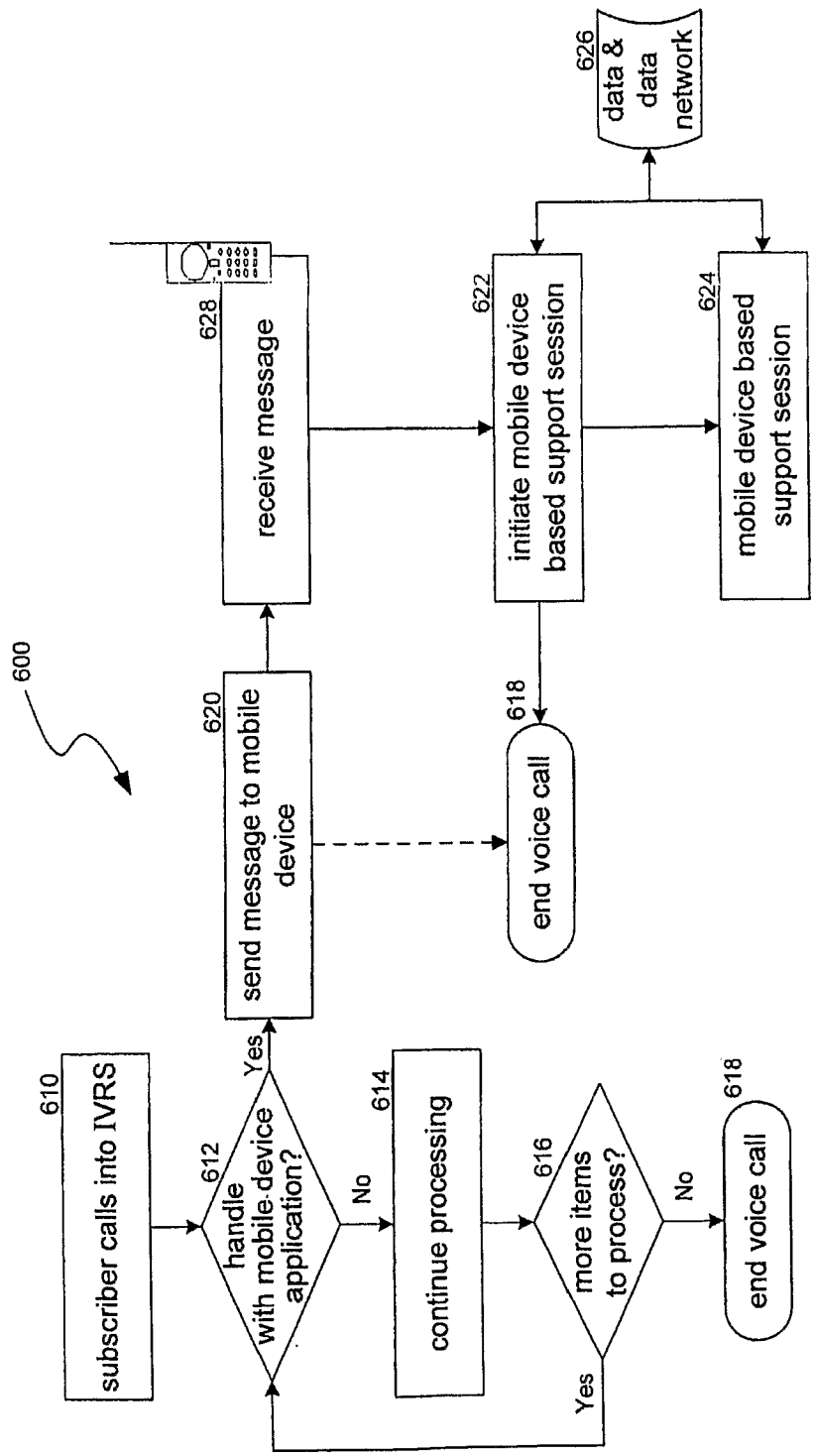
FIG. 6B is a flow diagram illustrating a detailed routine for intercepting and redirecting a customer service support call at the mobile device.

FIG. 6B illustrates a detailed routine 600 for intercepting and redirecting a customer service support call at the mobile device 100. In block 610, a subscriber dials a customer service support number to access a customer support call center. The mobile device 100 determines if the subscriber's call should be locally intercepted and redirected to a mobile device application running on the mobile device or allowed to continue without redirection (block 612). (Alternatively, as described below, the call may be routed to the call center or an interactive voice response system (IVRS), and then bounced back to the mobile device.) The mobile device 100 determines if the number dialed matches a number stored locally in a table. If the number matches, then the call is intercepted. If the subscriber's call is allowed to continue without redirection (block 614), then the call center determines whether more items need to be processed (block 616). If more items need to be processed, then the call center directs the subscriber's call to block 612 to process the call and to determine if the call should be intercepted. If no more items need to be processed, then the subscriber's call ends (block 618).

If the mobile device 100 determines that the subscriber's call should be intercepted at block 612, then the call, along with access information required to route a message to the mobile device, is directed to the mobile device application running on the subscriber's mobile device (block 620). In one embodiment, the mobile device could play sounds or show a dialog on the display to indicate that a call has been intercepted. The mobile device application routes a signaling message, indicating that the subscriber's call has been intercepted, to the customer support call center via network signaling technologies such as SMS or USSD, and may receive a response message back. In block 628, the mobile device 100 receives and processes any signaling message from the mobile device application. The mobile device may also receive certain customer self-support data from the network. In block 622, a customer support session begins on the subscriber's mobile device using locally stored data received from the mobile device application. The mobile device may use a variety of technologies to display and respond to the customer support issue in question. In block 624, the mobile device addresses the subscriber's support issue locally, as described below. In an alternative embodiment, the mobile device retrieves data or scripts from the network to address the subscriber's support issue, as noted above (block 626).

In an alternative embodiment, the call center determines if the subscriber's call should be intercepted and directs the call accordingly. The call center may utilize an IVRS (Interactive Voice Recognition System) to communicate with the subscriber. If the call center determines that the call should not be intercepted, then the call is allowed to continue through the call center for processing (block 614). If the call center determines that the call should be intercepted, then the call is redirected back to the mobile device for local processing (block 620). Thus, if the call goes through to the call center/IVRS, and then is routed back to the mobile device, the call to the call center may includes access information to facilitate routing a message back to the mobile device via SMS, USSD or other network signaling technologies. The call center employs a software application to direct mobile equipment, so that it automatically processes requests it receives from mobile devices.

Figure 7:
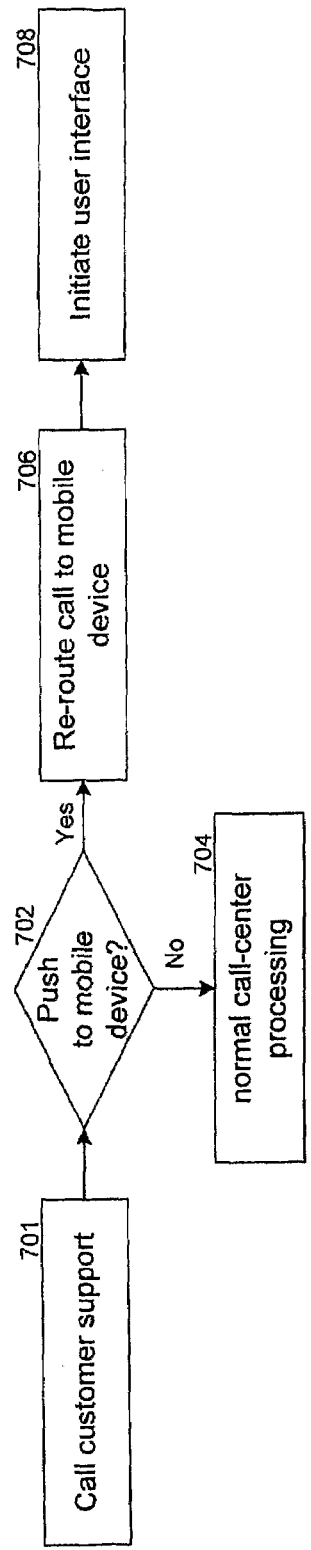
FIG. 7 is a flow diagram illustrating a routine for intercepting and redirecting a call after it has connected to a customer support call center.

A customer support call may be intercepted before connecting to a call center, as illustrated in FIG. 6A. A customer support call may also be intercepted and redirected after it has established a connection to the call center. FIG. 7 illustrates a routine for intercepting and redirecting a call after it has connected to a customer support call center. In block 701, a subscriber calls a customer support call center from his or her mobile device. The call connects to the call center, and the mobile device determines if the call should be intercepted (block 702). If the mobile device determines that the call should not be intercepted, then the call is allowed to continue to normal call center processing (block 704). If the mobile device determines that the call should be intercepted, then the call is redirected or rerouted back to the mobile device (block 706), where the mobile device displays a list of potential solutions to the subscriber's problems (block 708). Thus, a voice call is converted in to an action on the mobile device. The rerouting can be done by call center software rerouting the call back, or a proxy call center (FIG. 14) reacting to an inbound call with a device push.

FIGS. 8A through 8D illustrate a software routine for executing call intercept methods and related functionality. The software routine can be stored within the memory 116 of the mobile device 100. In block 800 of FIG. 8A, the mobile device locally receives an entered phone number, such as one for a customer service support call. The mobile device determines if the entered number matches an existing customer support number (block 802). This determination can be made by comparing the entered number with a list of recognized customer support numbers stored on the mobile device. If the entered number does not match, then the subscriber's call continues. If the entered number matches an existing number stored on the mobile device, then the mobile device intercepts and redirects the call to a process locally stored on the mobile device (block 804). A message indicating that the call has been intercepted may be displayed on the mobile device. The mobile device displays a list of potential solutions to the subscriber's problems on the mobile device (block 806), and may also display instructions for selecting potential solutions (block 808), as described herein.

Figure 8A:
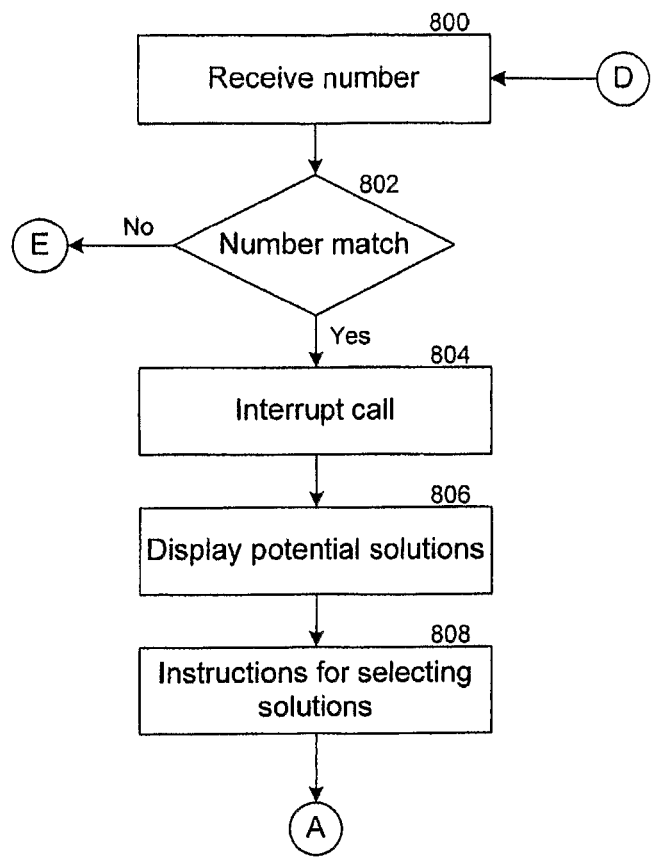
FIG. 8A is a flow diagram illustrating a software routine for executing call intercept methods.
Figure 8B:
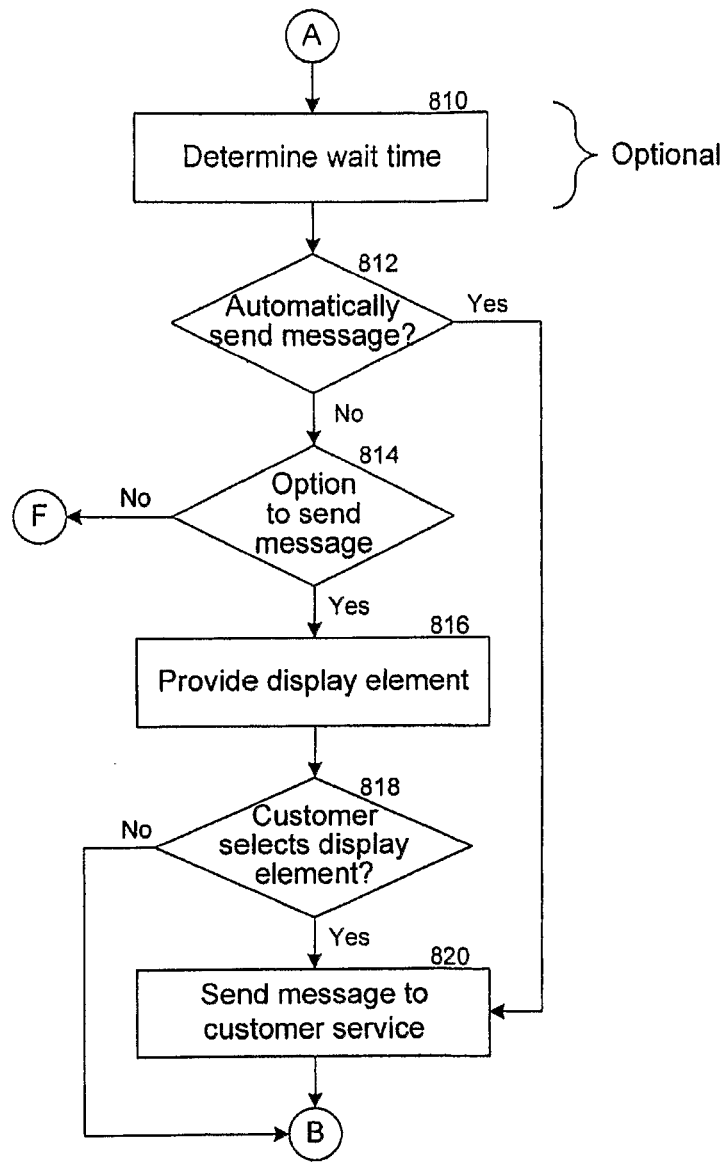
FIG. 8B is a flow diagram illustrating a routine for notifying customer support to call the subscriber back during heavy call volumes.

FIG. 8B now shows a subroutine for notifying the subscriber of heavy customer support call volumes. After a subscriber calls a customer support call center, the subscriber's mobile device can approximate and display the wait time for voice connection with a customer service representative (block 810). In one embodiment, the mobile device can approximate the wait time based on a formula that accounts for time. In an alternative embodiment, the mobile device can approximate the wait time using information queried from the network. The wait time may be displayed on the mobile device to discourage the subscriber from completing the call and to use the customer self-support functionality on the mobile device instead. In yet another embodiment, the mobile device may not determine or display the wait time at all.

The mobile device may intercept the customer support call and prompt the subscriber to automatically send a message to the customer support call center to call back at a later time (block 812). If the subscriber elects to send a message to the customer support call center to call back at a later time, then the subscriber's request for customer support is placed into a queue for the call center to return a call when call volumes permit (block 820). The message may be in the form of an e-mail, SMS, IP, or others. The message may contain customer-related information (e.g., phone number, name, potential questions, etc.). The subscriber may use the mobile device as usual after sending the message to the customer support call center. The mobile device may track the requested call, and the subscriber may cancel the request if he or she finds a solution locally on the mobile device.

If the subscriber elects not to send a message to the customer support call center to call back at a later time, then the mobile device may provide the option to send a message later on (block 814) using a display element on the display (block 816). If the subscriber selects the display element on the display, then the message will be transmitted to the call center requesting a call-back.

In one embodiment, the mobile device could record all of the actions performed by the user, whereby after completing all of the help screens on the mobile device, the mobile device could place a call to a zero wait queue at the customer care center and provide all of the keystrokes or other information from the mobile device to the customer care representative. In this way, the customer care representative will be apprised of what the subscriber has done and needs help with. This may be in conjunction with the mobile device previously sending out a request message to the customer care center, and then receiving a special number, such as a 36-digit number, to be used to access the zero wait queue and to initiate a help ticket for the customer care center.

Figure 8C:
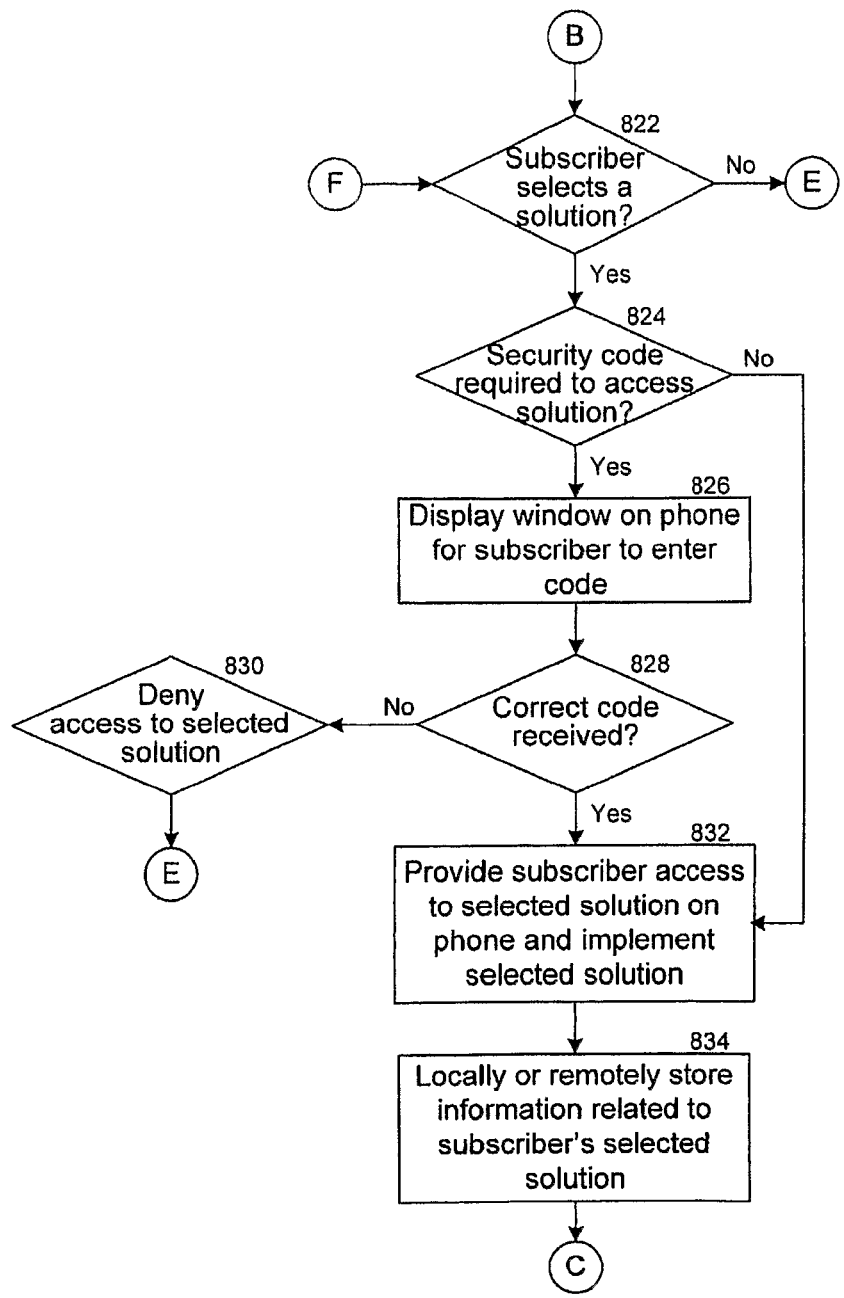
FIG. 8C is a flow diagram illustrating a routine for accessing a solution to a customer support issue.

Continuing to FIG. 8C, a subroutine for accessing a solution to a customer support issue begins where the subscriber selects a solution to a customer support issue on the mobile device (block 822). If a security code is not required to access the solution on the device (block 824), then the mobile device provides the selected solution, which may be implemented on the device itself (block 832). The selected solution may involve step-by-step procedures or screens, informational graphics, a video and/or audio clip, multiple executables for data on the mobile device, multiple executables for data on the network or remote server, or others. After the mobile device provides access to and implements the selected solution, the device may locally or remotely store information related to the subscriber's selected solution (block 834).

In block 824, if a security code is required to access the selected solution, then the mobile device may prompt the subscriber to enter the security code to access the selected solution (block 826). If the security code is incorrect, then the mobile device will deny access to the selected solution (block 830). If the security code is correct (block 828), then the mobile device will provide access to the selected solution and may implement the solution (block 832). An example of this is provided below with respect to FIGS. 9A and 9B.

Figure 8D:
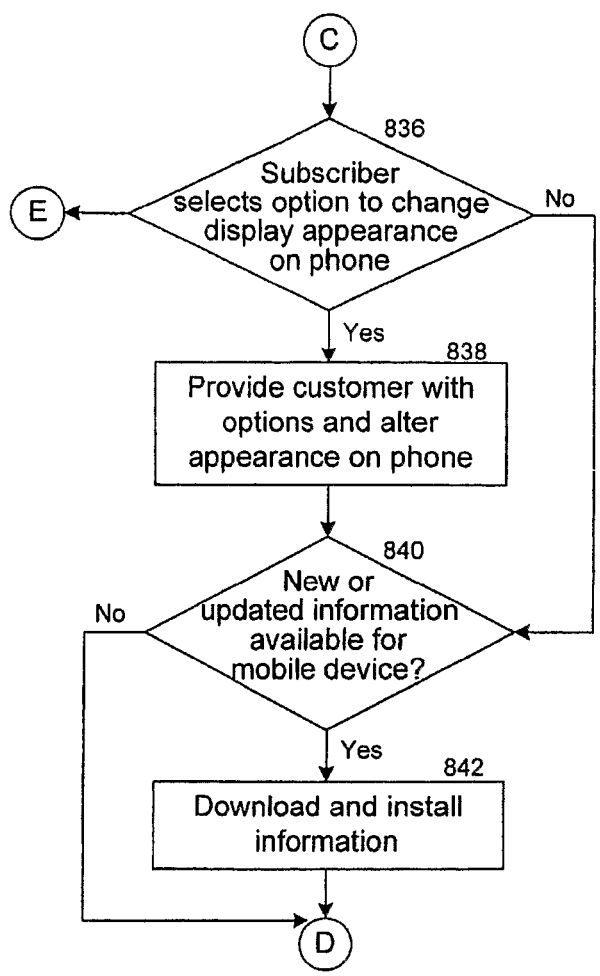
FIG. 8D is a flow diagram illustrating a routine for altering display elements on the mobile device.

FIG. 8D now illustrates a subroutine for altering display elements on the mobile device. If a subscriber selects an option to change the display appearance on the mobile device (block 836), then the mobile device provides the subscriber with options to alter the appearance of the display (e.g., brand name, shading layers, multiple time zones, status of mobile device, status of network, etc.—block 838). This is one example of facilitating user configuration of the device—many others are possible.

The mobile device may also check to see if new or updated information is available for the mobile device (block 840). For example, information can refer to scripts or other software executables that can be downloaded from the network to the mobile device. If new information is available, then the mobile device downloads and installs the information (block 842). If new information is not available, then the phone proceeds to receiving and processing a dialed number once again.

Changing the display appearance on the mobile device may include superimposing branding on the mobile device's wallpaper, displaying two time zones when the mobile device recognizes transition to a new time zone, and others, as described below. The mobile device can display a ticker across the top of the screen that says, e.g.: "Welcome to customer care: the average wait time is five minutes. You may now look at the screen below to help resolve problems or answer questions more quickly." Also, the mobile device may provide audio feedback or audio scripts, such as the ringing of a call or the sound of a pickup, and a voice script that provides the same information as provided in the ticker. This can then take the place of the actual placing of a call. Similar audio scripts may be provided to mimic the calling to and answering by a customer support call center.

Figure 9A:
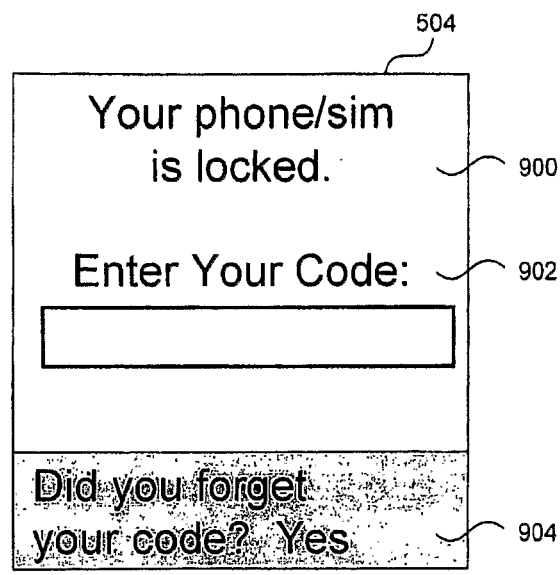
FIG. 9 is a diagram illustrating a routine for SIM (Subscriber Identity Module) unlocking on a mobile device.
Figure 9B:
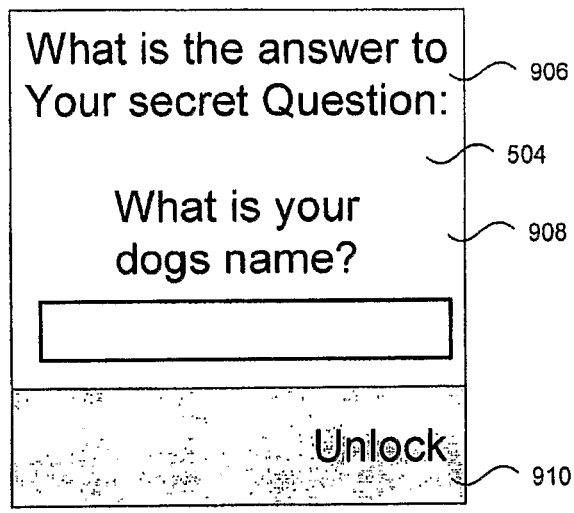

One example of a common customer support call is to retrieve the SIM (Subscriber Identity Module) unlock code. FIGS. 9A and 9B illustrate suitable screens to help a user in unlocking a SIM on a mobile device. Portion 900 of FIG. 9A explains that the SIM is locked. The display 504 on the mobile device may prompt the subscriber to enter a code to unlock the SIM portion (902). If the subscriber indicates that he or she has forgotten the code (e.g., provides input to a screen portion—904), then the mobile device may prompt the subscriber for alternate information to decrypt the SIM unlock code stored on the mobile device portion (906) of FIG. 9B. For example, the alternate information may be an answer to a question which here is the name of the subscriber's dog (908). Entering the correct name will unlock the SIM by selecting an "unlock" option after entering the correct answer (910).

Figure 10C:
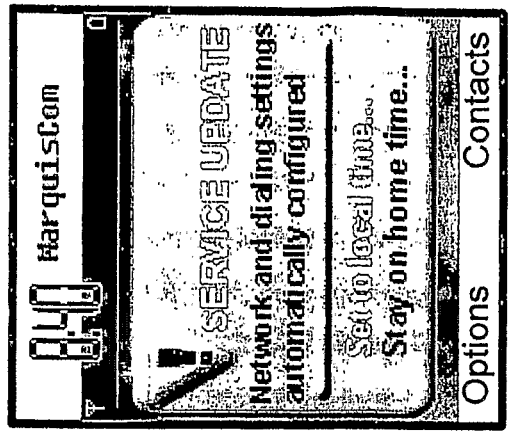
FIGS. 10A through 10C illustrate how the mobile device application can automatically detect and correct for roaming on the subscriber's mobile device.
Figure 10B:
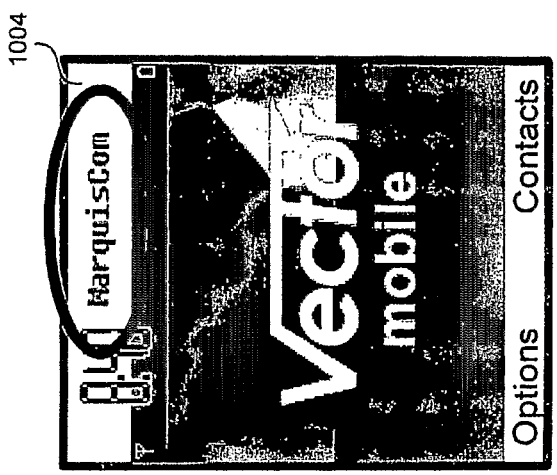
Figure 10A:
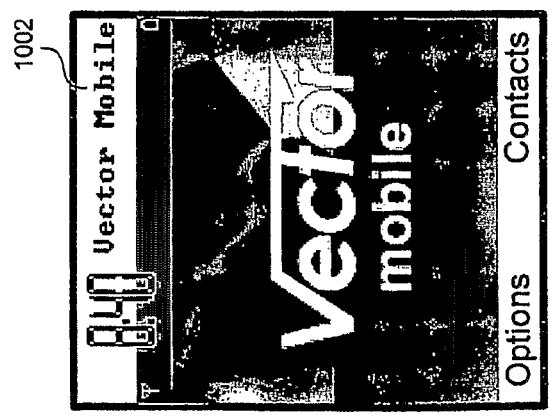

FIGS. 10A-10C are examples of mobile device screen displays communicating automated updates to a subscriber and responding to a network event. Referring to FIGS. 10A-10C, one example of how software described above operating on the mobile device 100 can automatically update functions on the phone is shown. As shown in FIG. 10A, an upper portion 1002 of the mobile device display 504 displays a name of a service provider "Vector Mobile", but as the mobile device roams across a network boundary, software on the mobile device receives messages from a new network. As the mobile device receives registration messages from a new network service provider, "MarquisCom," the device registers for voice service on the new network, and displays the name of the new network in the upper portion, as shown at 1004 of FIG. 10B. Further, the phone automatically establishes a correct access point name (APN) from preferred roaming partners of the subscriber's service provider, and the subscriber can continue to access data applications. In one embodiment, the mobile device application could detect roaming on a "611" call and call a toll free number to contact the subscriber's home call center for answering service question calls. This would allow the subscriber or wireless service provider to avoid additional fees. Further, the phone may automatically offer to change the phone's local clock time, add proper country codes to phone numbers in the mobile device's address book/speed dial list, and so forth, as shown in FIG. 10C. Overall, the scripts running on the mobile device not only detect network availability and status, but also device settings and configuration to automatically react to application errors. In this manner, the mobile device may capture subscriber activities and create standardized, scriptable functions that can be combined to create a context-sensitive service.

Figure 11C:
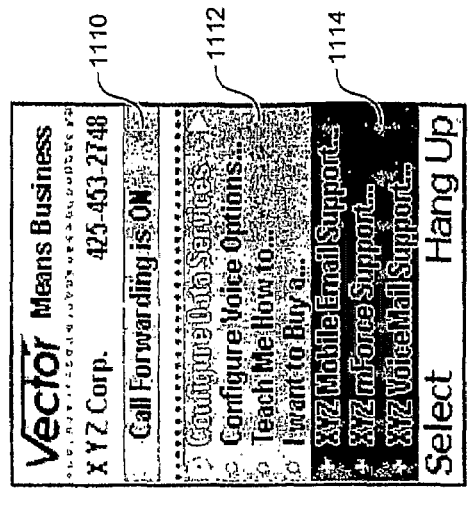
FIGS. 11A through 11C illustrate three different levels of service for three different groups of subscribers.
Figure 11B:
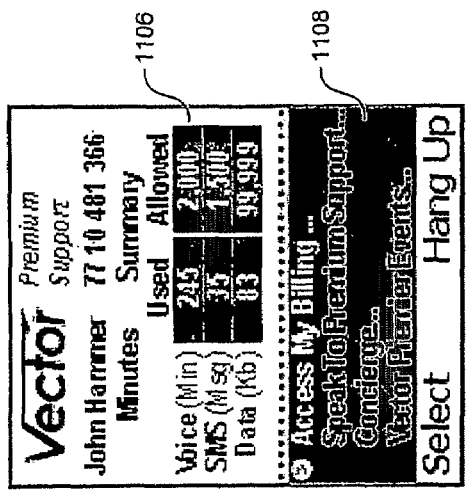
Figure 11A:
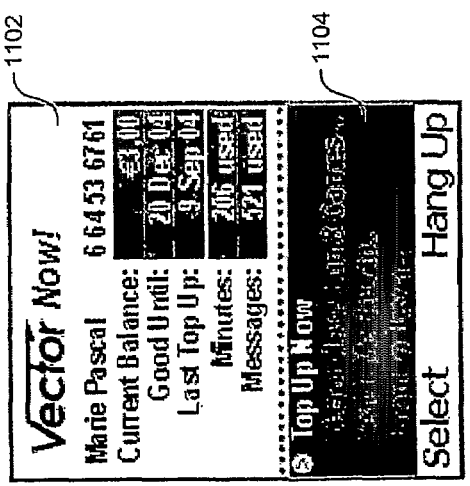

The service provider may also provide levels of service to different groups of subscribers. For example, FIGS. 11A, 11B, and 11C show examples of display screens provided to a basic customer, a high average revenue per unit (ARPU) customer, and an enterprise customer, respectively. With the example of FIG. 11A, the service provider can control the experience provided to the subscriber to minimize customer care costs while delivering high user experience, as noted herein. As shown in an upper portion 1102 of the screen of FIG. 11A, the user's name "Marie Pascal" and associated phone number are displayed, along with her current balance, expiration date of purchased minutes, last time minutes were topped up, number of minutes used, and number of messages used. A lower portion 1104 provides some common functions the subscriber may wish to perform, such as topping up a number of minutes now, accessing games or other desirable subscriber features (such as ring tones), an entry point into a series of help options, as well as an opportunity to purchase offerings from the service provider.

Under a mezzanine level of service (depicted in FIG. 11B), the service provider can enhance the high ARPU subscriber experience by providing premium service access, with integrated vendor support. Call backs can be scheduled from a customer service call center, and any service calls can be automatically routed to a premium support group or to a head of any queue. An upper screen portion 1106 depicts a chart showing used and allowed voice minutes, SMS messages, and kilobytes of data, while a lower portion 1108 depicts options for such a premium subscriber to access his or her billing records, to automatically speak to a premium customer support representative, to access concierge services, as well as to view upcoming events for premium subscribers.

FIG. 11C extends subscriber experiences to enterprise customers by allowing enterprise customers to have customized offerings and to allow for enterprise applications and vendor support. Enterprise specific services may be provided along with integration to the enterprise's help desk. As shown in FIG. 11C, an upper portion 1110 indicates certain enterprise functionality as being enabled, in this case, that Call Forwarding is on. A middle portion 1112 allows the enterprise subscriber to configure data to services, configure voice options, access a list of help or "teach me how" topics, and access a menu of item/services to purchase. A lower portion 1114 provides the enterprise subscriber with e-mail, voice mail, and data service support. Thus, the middle portion 1112 of the screen is carrier related, while and the lower portion 1114 is enterprise related (e.g., telling a subscriber how to implement voicemail).

Overall, data displayed in the screens of FIGS. 11A-11C may be refreshed automatically so there is no need for the subscriber to call customer care. If, however, the subscriber does call customer care, then the mobile device may forward relevant data automatically to the call center, and connect to a relevant group such as premium call services, advanced technical services, or a billing department. And, as noted above, an audio announcement is played initially so that the subscriber perceives an immediate response.

The mobile device support applications described herein also allow a user to access help instructions at an appropriate time, where these instructions are automatically provided to the user, rather than forcing the user to hunt through, at times, lengthy help menus for a relevant topic. Automatic instructions can be useful, for instance, when a subscriber dials "911." When a subscriber makes a "911" emergency call, the subscriber's mobile device may provide first aid instructions upon detecting that "911" is dialed. The mobile device may automatically provide information to the "911" PSAP (Public Service Answering Point) call center. The mobile device may also notify the PSAP that the phone has a camera, and the mobile device could then instruct the subscriber to send a picture or live video of the patient or victim to a medical specialist, such as an EMT (Emergency Medical Technician). (Conversely, the mobile device may receive an instructional video to help describe appropriate first-aid measures to apply to the victim.)

Furthermore, the system may be expanded to handle other calls, such as information or "411" calls. Here, the mobile device may intercept a 411 call and provide options to the user, such as a list of previously requested numbers (with or without associated information associated with these numbers), options to access information via commonly or recently accessed web pages, and so forth.

Figure 25:
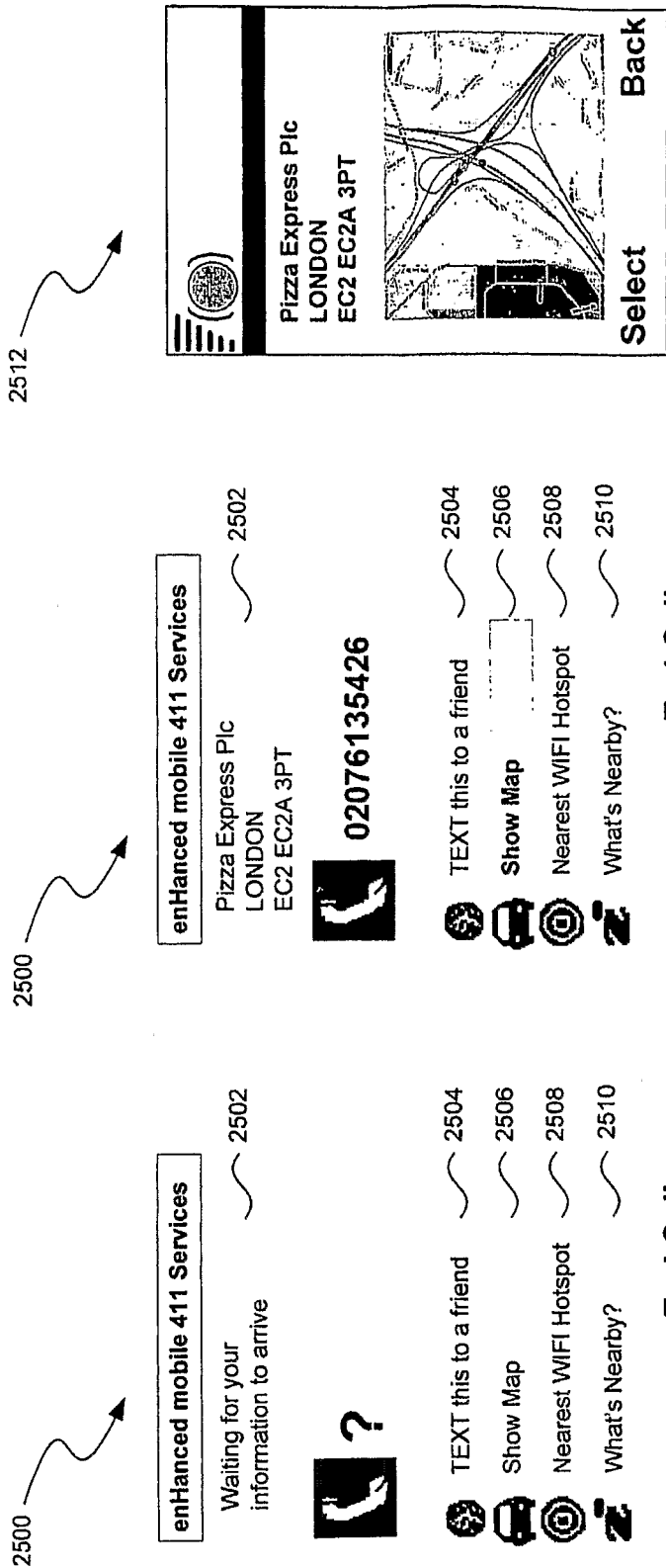
FIGS. 25A through 25C are mobile device displays screens illustrating local customer support for an information call.

FIGS. 25A through 25C show an example of providing local customer support for information calls. As shown in FIG. 25A, the customer dials a number for requesting information, such as "411," and in response the mobile device displays a screen such as screen 2500. The screen 2500 includes an information portion 2502 that indicates the status of the call, which in this case is that the subscriber is awaiting information from the service provider. The screen also shows options available to the customer once the desired information is obtained, such as sending received information to a friend via a text message (2504), showing a map of a location associated with the retrieved information (2506), identifying the nearest wireless access point or WiFi hotspot (2508), or identifying what commercial establishments or points of interest are nearby (2510). Since a script for providing the functionality shown is resident on the mobile device, the user immediately sees the options available, even before the requested information is received.

The wireless service provider may also provide detailed information, such as links to one or more web pages associated with the requested information, or specific information that needs to be displayed on the mobile device based on the options provided, such as providing to the mobile device a map of the requested information. In this example, the subscriber selects to view the map (via option 2506), and the now locally stored map may be shown on the mobile device, as shown in FIG. 25C. The mobile device launches any appropriate device application to display or access data. In the example of FIG. 25C, the mobile device launches a web browser to display the map. In response to the subscriber's 411 call, the wireless service provider may provide back information to be displayed on the subscriber's phone, such as that shown in upper portion 2502 in FIG. 25B. As also shown, the subscriber has selected to display a map of the obtained information.

As shown in FIG. 12A, a user has taken a picture or otherwise captured an image via the mobile device 100. In response, the phone then captures the event, allows a scriptor to create a context-based reactionary process, and provides a service alert, shown in FIG. 12B, that asks the user whether he or she wishes to send the picture to another person, and if so, the phone then walks the user through one or more additional screens to instruct the user as to how to perform this operation. As a result, these user guides are interactive and context-sensitive. Usage of these functions by subscribers is promoted via on-screen suggestions, and training is delivered at the point it is most valuable to the user.

Thus, an added component of providing localized customer support involves the use of tutorials or guides to instruct subscribers in using applications or functions on their mobile devices. When a subscriber launches an application on their mobile device for the first time, the mobile device may be able to detect this first time usage. The mobile device may then locally launch an automated training tutorial that addresses the context of the application or situation. The tutorials serve to guide the subscriber along and include a set of instructions. In addition, the mobile device may automatically collect configuration or setup data from the subscriber to deliver automated, context-sensitive tutorials and guides at relevant times. Alternatively or additionally, the mobile device may retrieve training tutorials or guides from the network, or the use of automated, context-sensitive training tutorials in one application or service may key automated training in another application or service. Results of the training tutorials may be logged for offline analysis. Further, rather than just providing the tutorial functionality the first time, the mobile device can monitor usage of device functions and initiate the tutorial functionality after a predetermined period of time has elapsed (e.g. three months). After the predetermined time, the mobile device may assume that the subscriber has forgotten how to perform the desired function and therefore again provides the tutorial functionality. Alternatively or additionally, the mobile device may provide a tutorial after a preset number of times. For example, if a subscriber has taken three pictures and has not emailed or otherwise sent any photo messages, then the mobile device launches a tutorial regarding how to send photos via the mobile device (or provides an indication to the subscriber asking whether he or she would like to view the tutorial).

Figure 23:
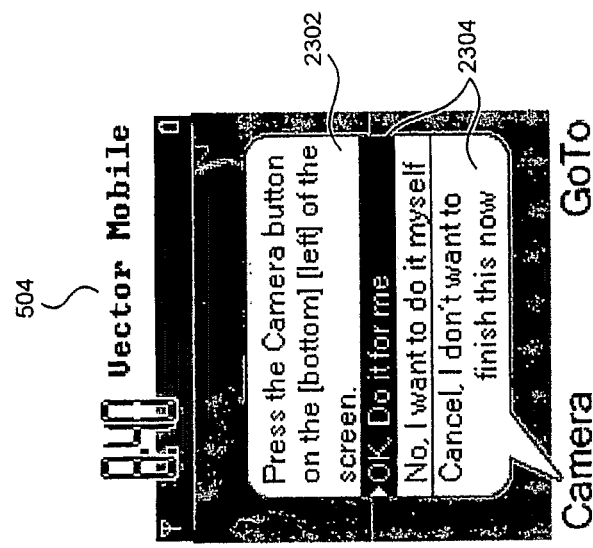
FIG. 23 is a diagram illustrating a context-sensitive screen for assisting users.

FIG. 23 illustrates an example of a context-sensitive screen for assisting subscribers. This context-sensitive screen may appear on a mobile device display in response to a subscriber selecting a function for the first time. For example, a subscriber may access a button or function for taking a picture on the mobile device. A context-sensitive screen may appear on the display 504 in response to the selection, which here in an initial coaching statement 2302 that begins walking the subscriber through the steps needed to learn the new application—taking a picture and then storing or sending that picture. In addition, the context-sensitive screen may contain a list of options 2304 that provides the subscriber with different options for handling a function.

Thus, the phone can recognize first-time usage and usage in one application, function, or service may key training in another for the user. As noted above, when the subscriber launches an application on his or her mobile device for the first time, an interactive training session automatically recognizes this first time usage and launches a training session accordingly. The small training scenarios guide the users along, and may collect configuration or setup data, as well as feedback data that could be provided to the service provider. These user guides need not be locally stored, but can be distributed over the air from the network as necessary, although common guides can be used to cross all applications and be stored locally for such purpose. The support application on the mobile device monitors usage behavior and launches training scenarios for user guides based on mobile device events. By automatically activating such user guides, the subscriber's understanding of existing applications or services provided are deepened, and results can be logged on the phone and downloaded to the network, or transmitted to the network in near real-time for off-line analysis.

Figure 26:
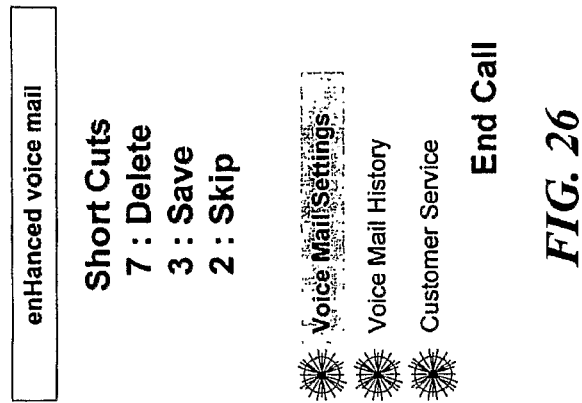
FIG. 26 is a mobile device display screen depicting customer support without interrupting a call.

FIG. 26 shows another example of providing customer support to a subscriber. (As generally used herein, the terms "subscriber," "customer," "user" and the like are used interchangeably.) When the subscriber presses and holds the "1" button the mobile device, the mobile device automatically accesses the subscriber's voicemail account. Substantially simultaneously, a help screen, as shown in FIG. 26, pops up to display helpful information, such as short cuts for navigating the voicemail system. Also displayed are options or links to access other information, such as a link to access voicemail settings, a link to access voicemail history, as well as a link to access customer service. In this example, the call to voicemail is not interrupted, but instead the user experience on the mobile device is enhanced by providing local customer support. Thus, the user interface on the mobile device provides a richer experience and more ease of use to the subscriber. Further details on suitable user interface options may be found in PCT Patent Application No. US2005/005517, entitled "USER INTERFACE METHODS, SUCH AS FOR CUSTOMER SELF-SUPPORT ON A MOBILE DEVICE" assigned to the same assignee as this application and filed Feb. 18, 2005.

Figure 13:
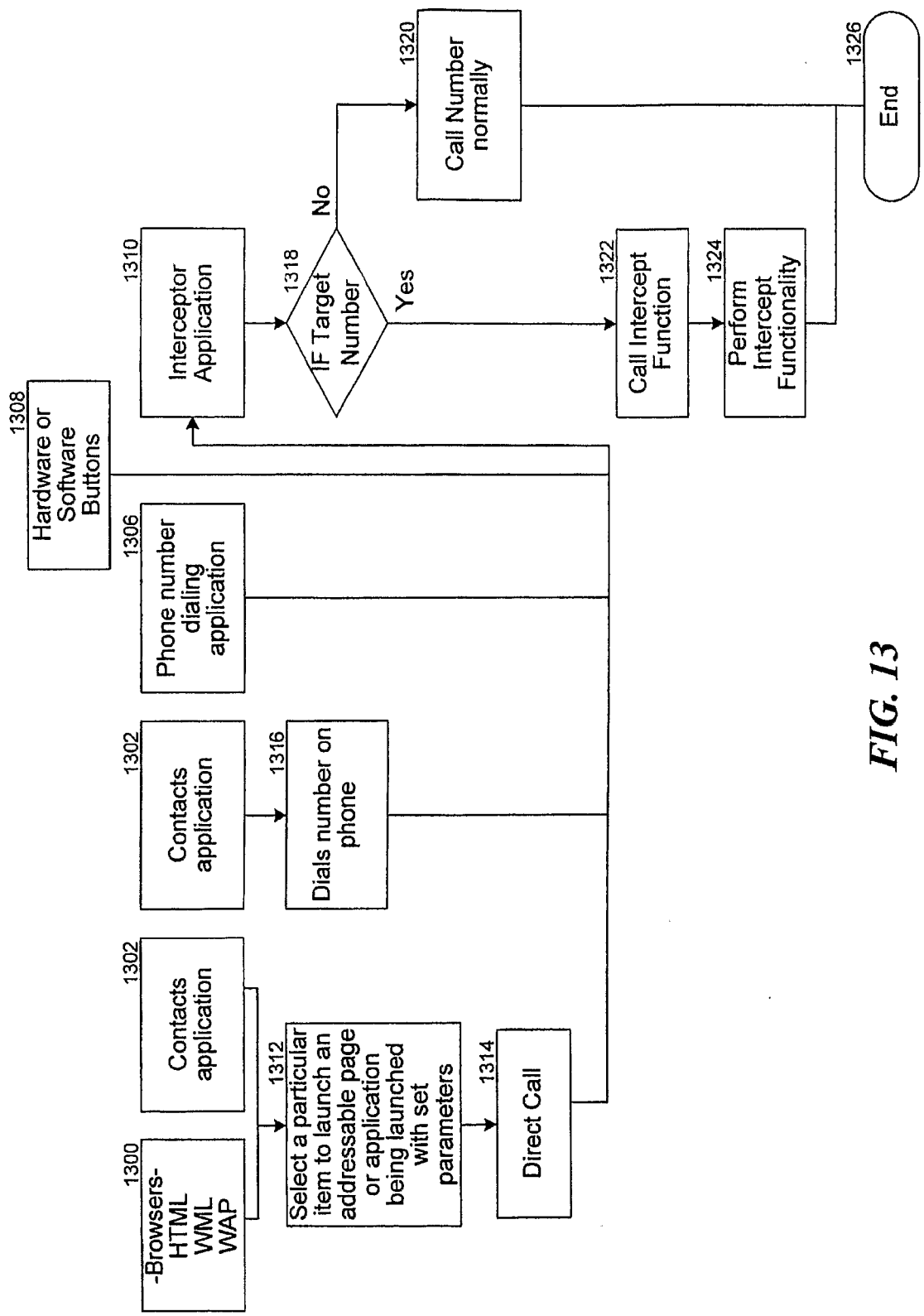
FIG. 13 is a flow diagram illustrating various applications running on the mobile device that interact with the call intercept function.

FIG. 13 illustrates various applications running on the mobile device that interact with the call intercept function. A subscriber may select a particular item in a browser 1300 or a contacts application 1302 to launch an addressable webpage or application (block 1312). Selecting a customer support phone number from the contacts application 1302 may lead to a call (block 1314 and 1316) that is intercepted by the subscriber's mobile device under a call intercept function (block 1322) of a call intercept application (block 1310) on the device. A phone number dialing application 1306 and hardware or software buttons 1308 may also be utilized to make a call that may be intercepted by the call intercept function 1322. In general, the interceptor application 1310 may receive a phone number from a subscriber, and determine if the entered number matches a number stored in the mobile device (block 1318), and if so, intercepts the call (block 1324). If the phone number does not match a number stored in the mobile device (block 1318), then the call goes through to the call center (block 1320) before ending (block 1326).

Figure 14:
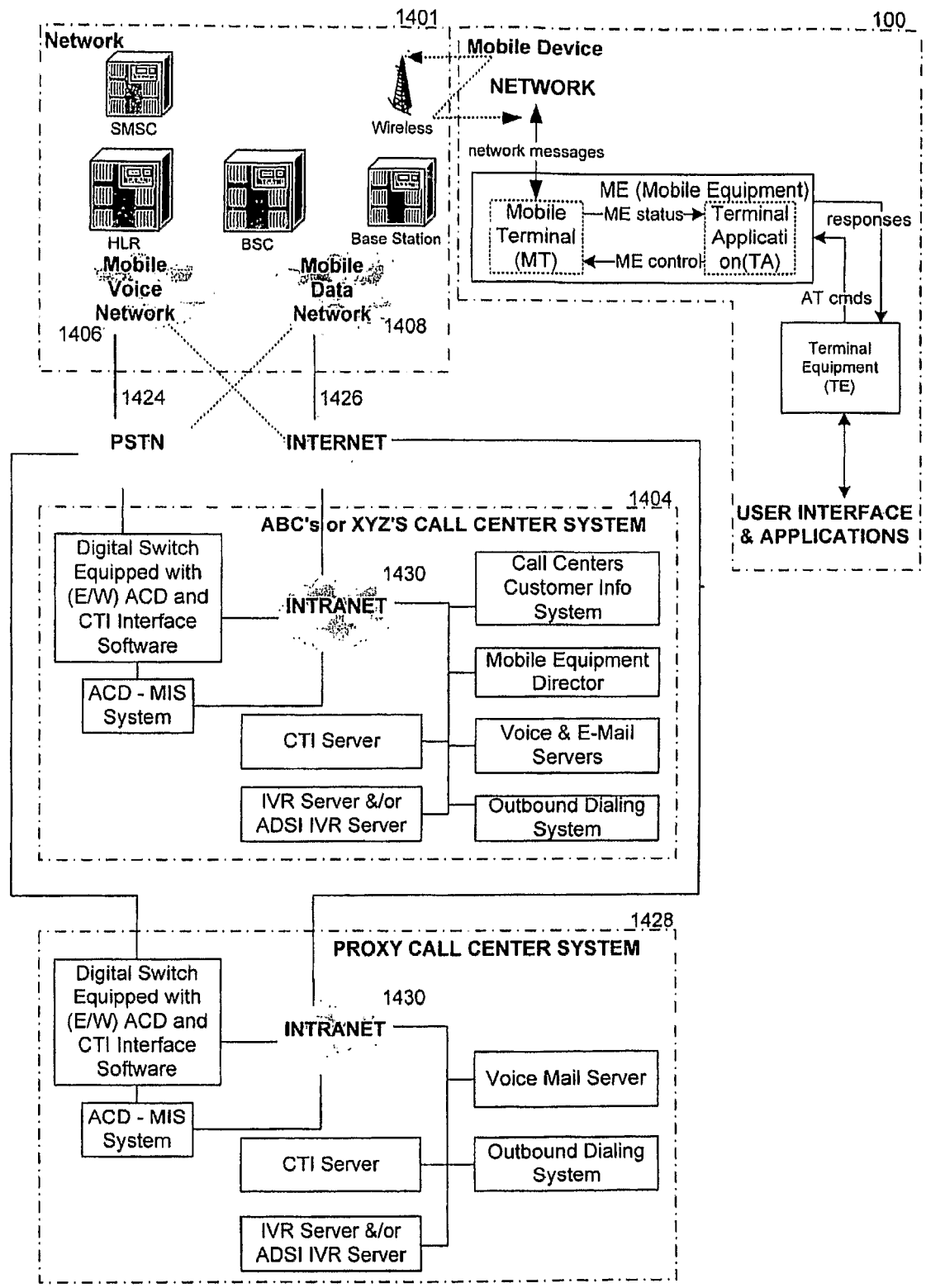
FIG. 14 is a schematic diagram illustrating remote activation of a mobile device application.

FIG. 14 illustrates remote activation of a mobile device application. The mobile device 100 interacts with a network 1401 which may include a mobile voice network 1406 for handling voice calls and a mobile data network 1408 for handling data. The mobile voice network 1406 interacts with the call center system 1404 through a PSTN (Public Switched Telephone Network) 1424. The mobile data network 1408 may interact with the call center system 1404 through the Internet 1426. The call center includes various known components, some of which are shown, including automated call distribution (ACD) and computer-telephony interface (CTI) software, and an interactive voice response (IVR) or analog display services interface IVR.

A proxy call center system 1428 may remotely activate a mobile device that does not contain the mobile device application by sending a network message (e.g., SMS, USSD, etc.) via the PSTN 1424. The message contains a link to a local or a remote screen, which may be used to activate the device. The remote activation of a mobile device may occur at the primary, tertiary, or proxy call center systems. The proxy call center 1428 includes other known components, some of which are shown.

Figure 15A:
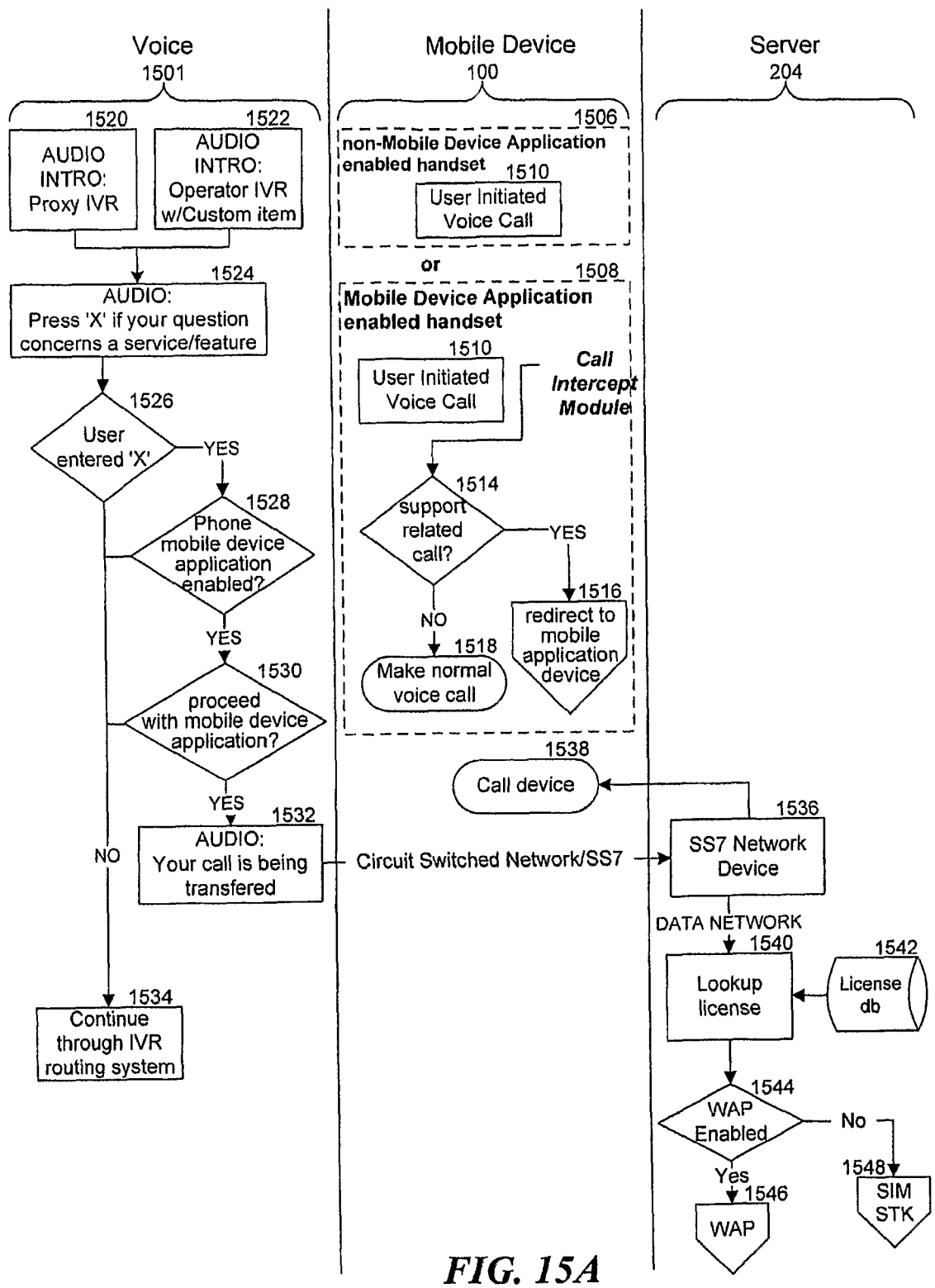
FIG. 15A is a flow diagram illustrating a call routing system for mobile device based customer support.

FIG. 15A illustrates more details on a call routing system for mobile device based customer support in accordance with an alternative embodiment. The call routing system may include a call flow having voice 1501, mobile device 100, and server 204 components. A subscriber may initiate a call (block 1510) using a mobile device that includes a mobile device support application (block 1508) to intercept calls or ordinarily with a mobile device that does not include such a mobile device support application (block 1506). If the mobile device does not include a mobile device application, then the proxy call center system 1428 may remotely activate the self-support functions on the mobile device by sending a network message. In an alternative embodiment, the proxy call center system 1428 may remotely activate the self-support functions after the call has been made to the customer support call center, and even download any necessary software or help screens to the mobile device. If the mobile device includes the mobile device application, then the mobile device determines if the entered phone number matches an existing customer support number (block 1514). If the entered number does not match an existing customer support number stored on the mobile device, then the call continues without interruption (block 1518). If the entered number matches an existing customer support number stored on the mobile device, then the mobile device intercepts the call and redirects the call to the mobile device application on the mobile device (block 1516).

Under this alternative embodiment of FIG. 15, once a call has been initiated (block 1510), an audio introduction using a proxy IVR via the proxy system 1428 (block 1520) or an operator IVR via the call center 1404 (block 1522) may be initiated. (Alternatively, the mobile device may have locally stored audio files or scripts to mimic or spoof a call to a call center.). Either way, the subscriber is audibly prompted to press a button (e.g., "X") if the subscriber's question corresponds to a particular service or feature (block 1524). If the subscriber does not press the button corresponding to the service (e.g., "X"—block 1526), then the call continues through the IVR routing system without interruption (block 1534). If the subscriber presses the button corresponding to the service (block 1526), then the call center determines if the mobile device has the required self-support mobile device application (block 1528). If the mobile device has the mobile device application (block 1530), then the mobile device intercepts and redirects the call to the mobile device itself (block 1532) and provides an appropriate audio message.

The mobile device application on the mobile device typically addresses the subscriber's question and solves the issue locally, as described above. In cases where the mobile device application is unable to solve the issue locally, the mobile device may rely on data to solve the issue from the network 204 (block 1536) thereby and provide data to the device via a caller appropriate connection (block 1538). When the network 204 receives a request for data from the mobile application device, the network may verify that the mobile device application has a license (block 1540) to access data from a license database (1542). The network 204 may also determine if the mobile device is WAP (Wireless Application Protocol) enabled (1544). If the mobile device is WAP enabled, then data can be transmitted from the network 204 to the mobile device using WAP (block 1546). If the mobile device is not WAP enabled, then data can be transmitted from the network to the mobile device using a non-WAP enabled protocol, such as via a SIM STK (SIM application toolkit—block 1548).

Figure 15B:
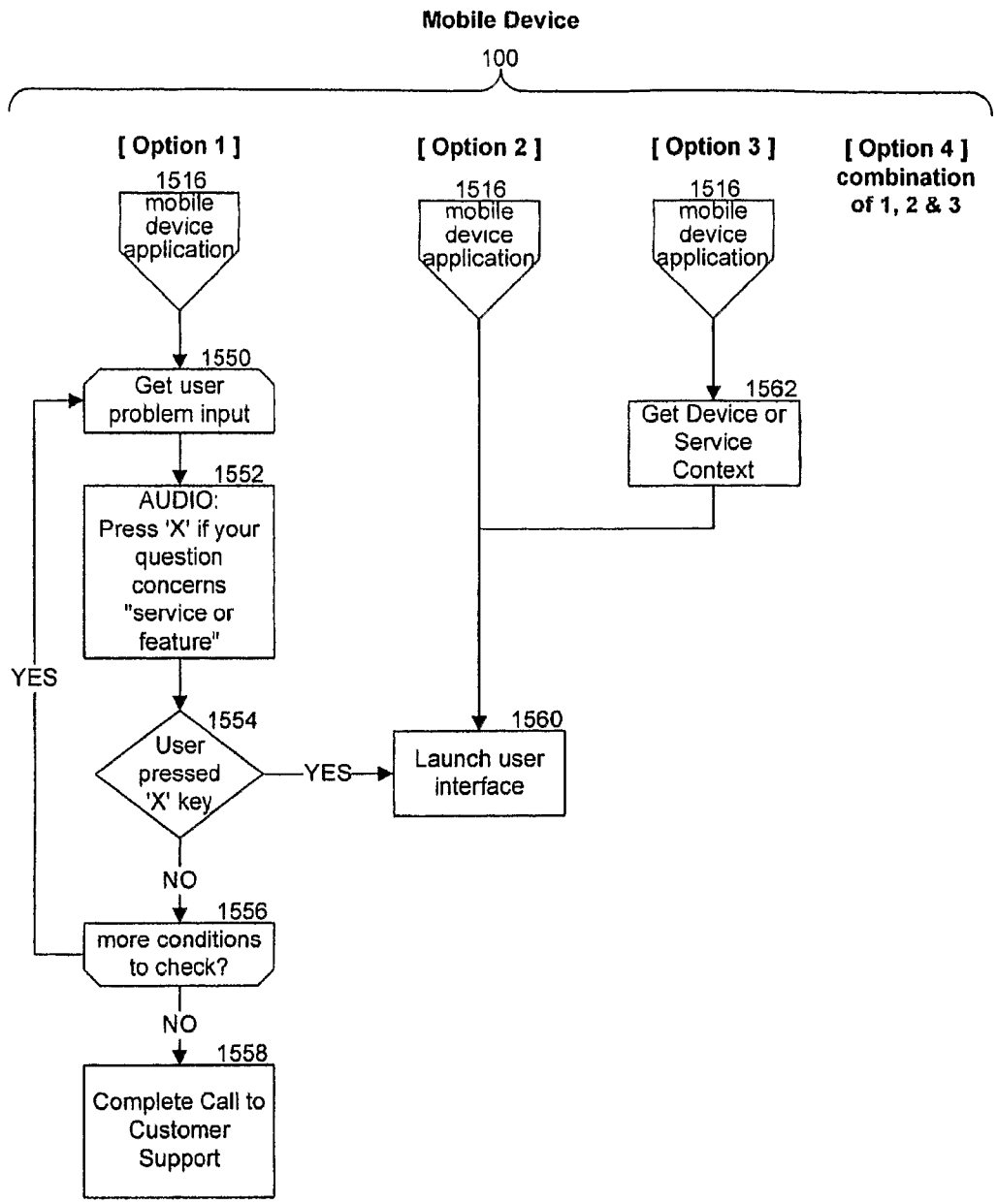
FIG. 15B is a flow diagram illustrating various options for providing customer support locally on the mobile device using a mobile device application.

FIG. 15B illustrates four options for providing customer support locally on the mobile device using the mobile device application following block 1516 of FIG. 15. In a first option, the mobile device prompts the subscriber for input (block 1550). The mobile device may prompt the subscriber to select a button (e.g., "X") if the subscriber's question corresponds to a particular service or feature (block 1552). If the subscriber does not select the button corresponding to a particular service or feature (block 1554), then the mobile device may present more options for the subscriber to choose from (block 1556). The subscriber may select an option (block 1554) or may complete the call to customer support (block 1558).

If the subscriber selects the button corresponding to a particular service or feature (block 1554) or directly under a second option, then a user interface for the mobile device application is launched (block 1560) to provide self-support to the user. Under a third option, the mobile device application retrieves device or service context and launches the user interface for the mobile device application (block 1562), while a fourth option may consist of a combination of the first, second, and third options. The device context can include a current state of the mobile device and a series of inputs provided to the device based on a running log of states and inputs tracked by the device. For example, the memory 118 may include an image recently stored there, and the input log may show that the mobile device recently took a picture and that a list of electronic addresses/numbers is being accessed on the phone. Thus, the mobile device application may use this context information to guess that the user may be trying to send the picture to a friend and thus ask through the user interface whether the user would like instructions on how to send the picture. Other context information may be gathered, including system data (e.g. whether a call was recently dropped).

Figure 16:
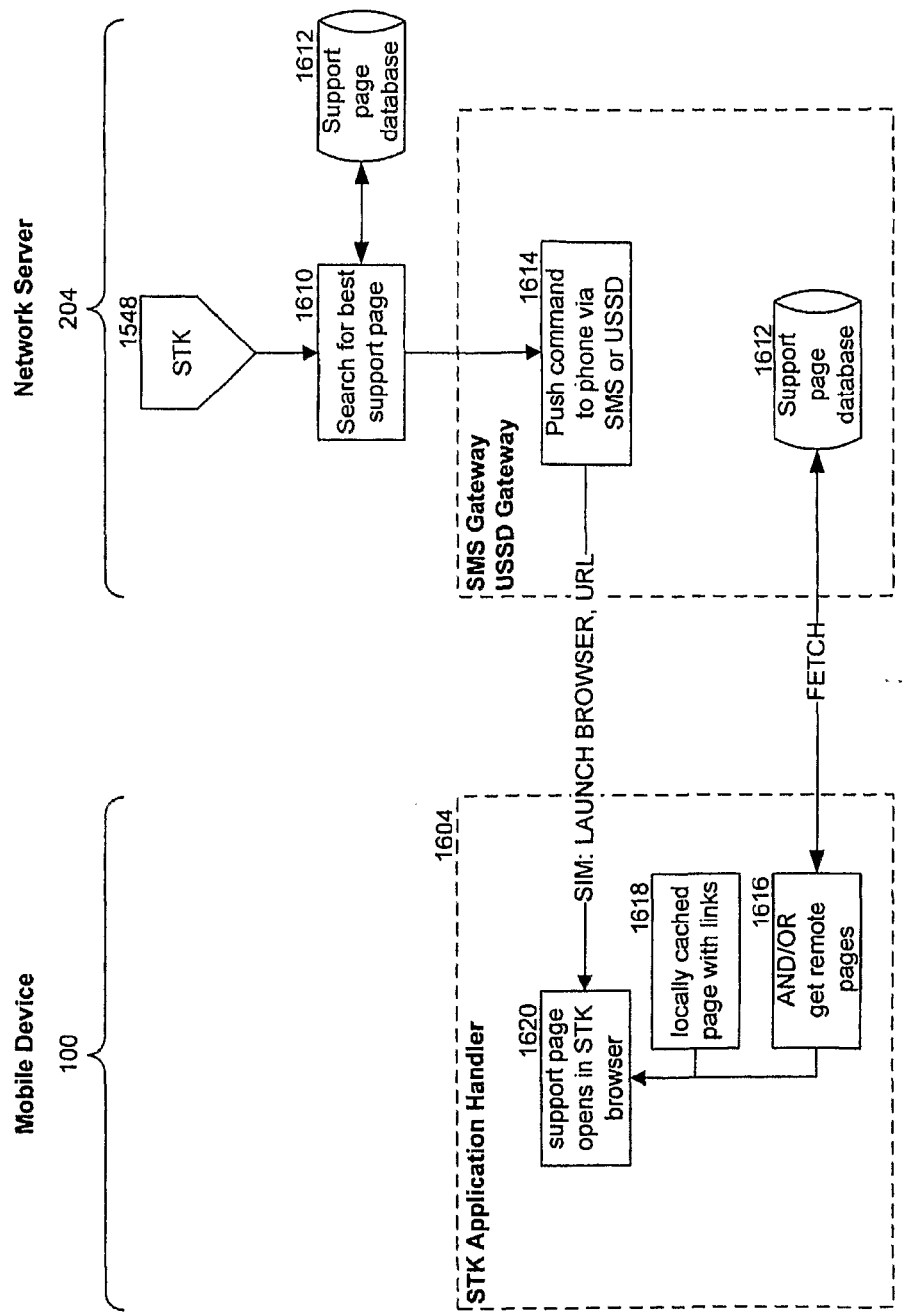
FIG. 16 is a flow diagram illustrating a routine for communicating data between a network and a mobile device.

FIG. 16 illustrates a routine for providing support from the network server 204 to a mobile device 100 following block 1548 of FIG. 15. The mobile device 100 may include a STK (SIM application toolkit) for driving the interface and the exchange of data between the mobile device and the network server 204. The STK may search for relevant support pages (block 1610) in response to a data request from the mobile device application. The relevant support pages may be stored in a support page database 1612 on the network server 204. The relevant support pages may be pushed to the mobile device via SMS, USSD, or other methods (block 1614). An STK application handler 1604 on the mobile device opens the support pages using a browser (block 1620). In addition, additional support pages may be retrieved remotely from the network server (block 1616) and opened using the STK application handler. Support pages from the network server may also be stored locally on the mobile device (block 1618). These support pages provide data or instructions as described herein.

Figure 17A:
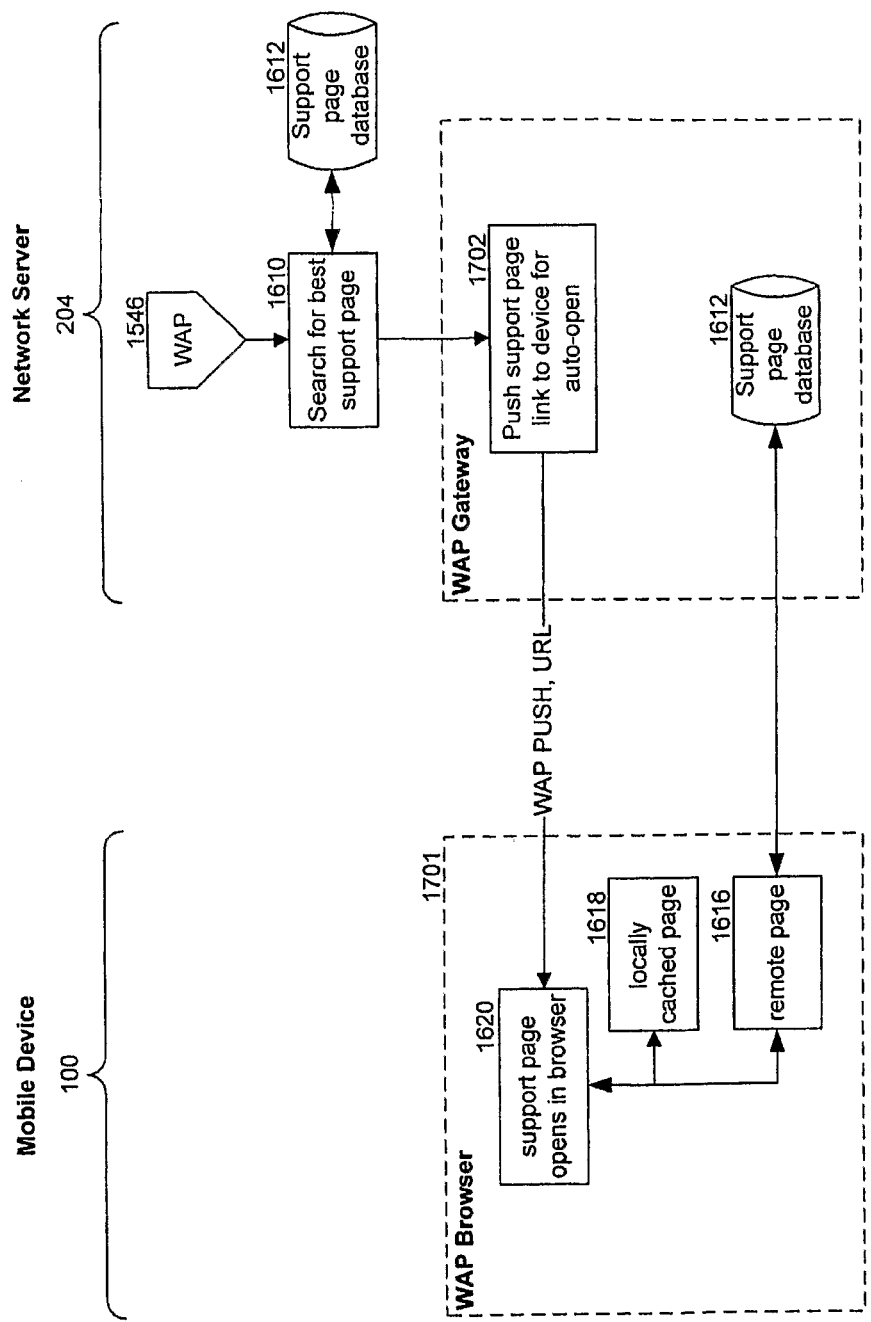
FIG. 17A is a flow diagram illustrating a routine for communicating data between a network and a mobile device using WAP (Wireless Application Protocol) push.

FIG. 17A illustrates a routine for providing support from the network server 204 to a mobile device 100 using WAP (Wireless Application Protocol) push following block 1546 of FIG. 15. The mobile device 100 may use WAP to search for relevant support pages (block 1610) in response to a data request from the mobile device application. The relevant support pages may be stored in a support page database 1612 on the network server 204. The network server may push a link to the relevant support pages to the mobile device using WAP push (block 1702). A WAP browser 1701 on the mobile device can then open the link to the support pages using a browser (block 1620). In addition, additional links to support pages may be retrieved remotely from the network server (block 1616) via the mobile device and opened using the WAP browser. Locally stored pages on the mobile device may also be accessed (block 1618).

Figure 17B:
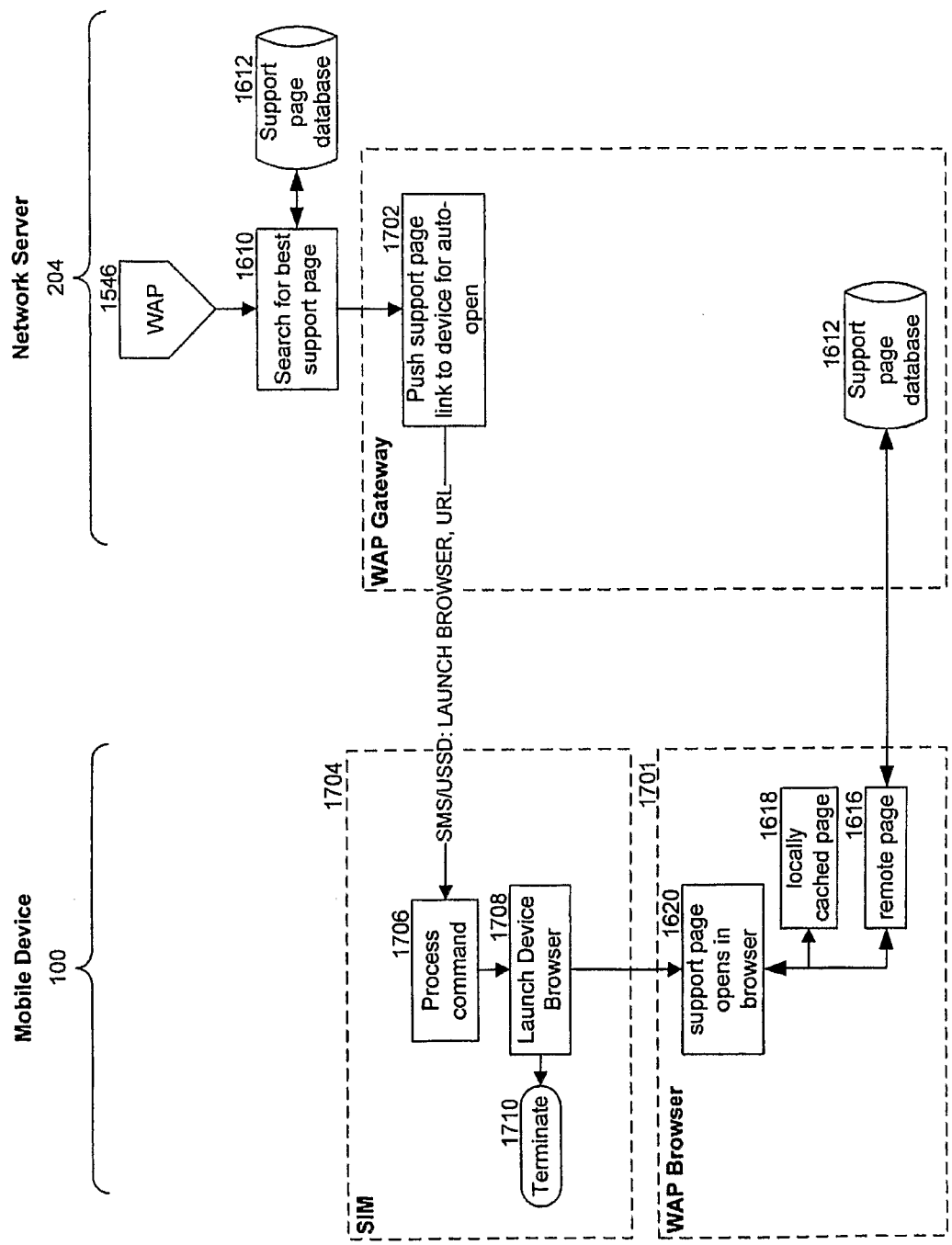
FIG. 17B is a flow diagram illustrating a routine for communicating data between a network and a mobile device via a SIM (Subscriber Identity Module) card.

FIG. 17B illustrates an alternate to that of FIG. 17A, and which includes communicating with a SIM (Subscriber Identity Module) card on the mobile device 100. There, the network server 204 may push a link to the relevant support pages to the mobile device using SMS or USSD (block 1702). A SIM card in the mobile device processes the link (block 1706) and may launch the browser on the mobile device (block 1708). The process may then terminate (block 1710) or continue to the WAP browser 1701, for further processing (blocks 1616-1620).

Figure 18:
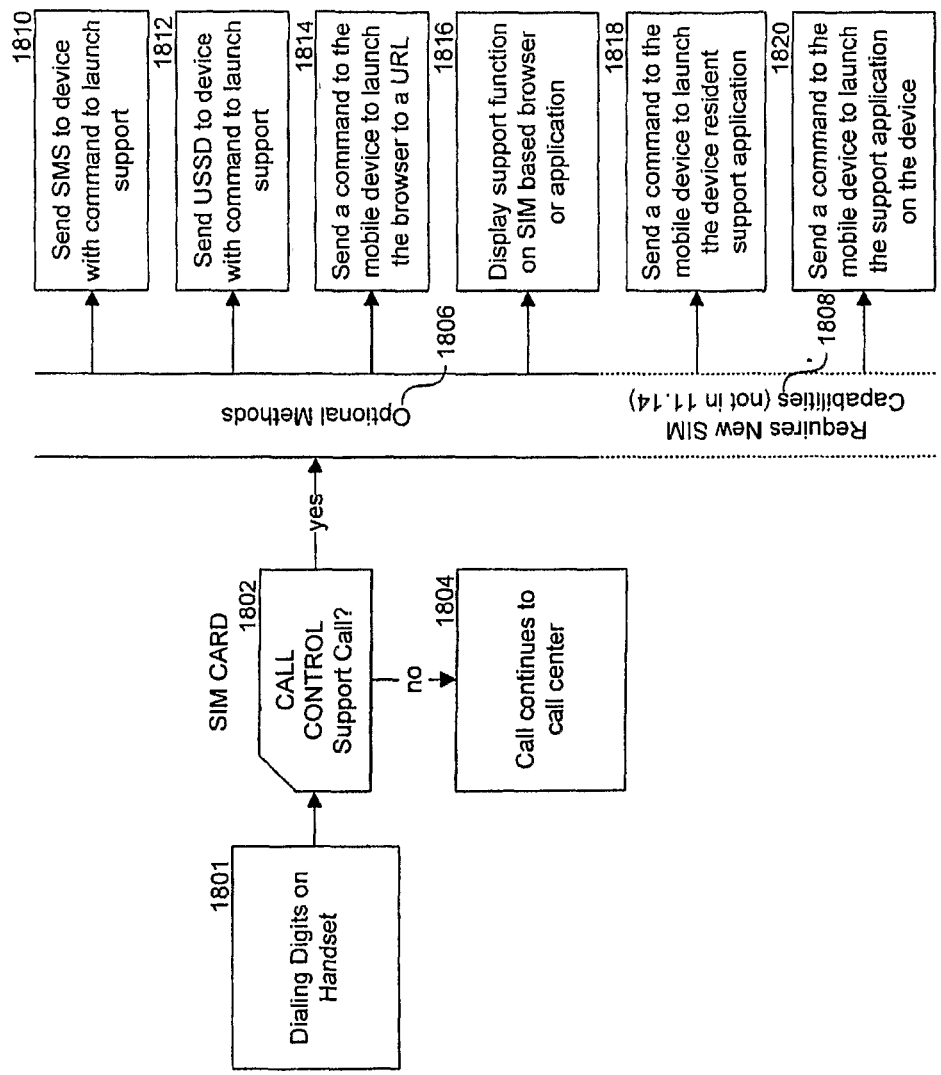
FIG. 18 is a flow diagram illustrating a routine for intercepting and redirecting a customer service support call from the mobile device using the call control capabilities of the SIM/USIM (Universal Subscriber Identity Module).

In an alternative embodiment, the SIM/USIM (Universal Subscriber Identity Module) on the mobile device may be used to intercept and to redirect customer service support calls. FIG. 18 illustrates a routine for intercepting and redirecting a customer service support call from the mobile device using the call control capabilities of the SIM/USIM (Universal Subscriber Identity Module). This alternative embodiment uses built-in capabilities of a 3GPP TS 11.14 compliant (or similar) SIM or USIM to perform call control to generically reroute calls for support back to the handset via SMS, supplementary service control strings, and/or other network and handset based control commands. This allows for routing calls without altering handset dialing programs.

As shown in FIG. 18, the subscriber first dials a number on the mobile device (block 1801). If the dialed number does not match a number stored on the mobile device, then the call continues to the call center without interruption (block 1804). If the dialed number matches a number stored on the mobile device, then the SIM card on the mobile device intercepts and redirects the call to the mobile device (block 1802) using SMS, supplementary service control strings, network and mobile device based control commands, and others.

In one embodiment, the SIM card may send a command via SMS to the mobile device to launch a support application (block 1810). In another embodiment, the SIM card may send a command via USSD (unstructured supplementary service data) to the mobile device to launch a support application (block 1812). In yet another embodiment, the SIM card may send a command to the mobile device to launch a browser to a URL (block 1814). In an alternative embodiment, the SIM card may display a support function on a SIM based browser or application (block 1816). In addition, mobile devices with advanced SIM capabilities may send a command to the mobile device to launch a resident support application (block 1818), or send a command to the mobile device to launch a support application on the device itself (block 1820).

Network-based services 204 may automatically query, set, save, and restore settings on the mobile device and SIM card or perform other functions. Alternatively, or additionally, the mobile device may locally perform diagnostic scripts on the device to gather user, device, and network data. Such scripts may be loaded over the air (OTA), and may be so loaded at any point, or initiated from a call center agent desktop computer. By either agent or mobile device initiation, diagnostic scripts on the phone are automatically initiated proactively to resolve problems encountered by the subscriber. In one embodiment, the mobile device or the call center agent can collect, via scripts, all the required information over the air without asking the subscriber.

The system may also resolve handset issues and record how the matter was resolved. The network service provider may provide proactive diagnostics to automatically correct top call-driven configuration issues to correct such problems and reduce the number of calls by subscribers to the customer support line.

Figure 19:
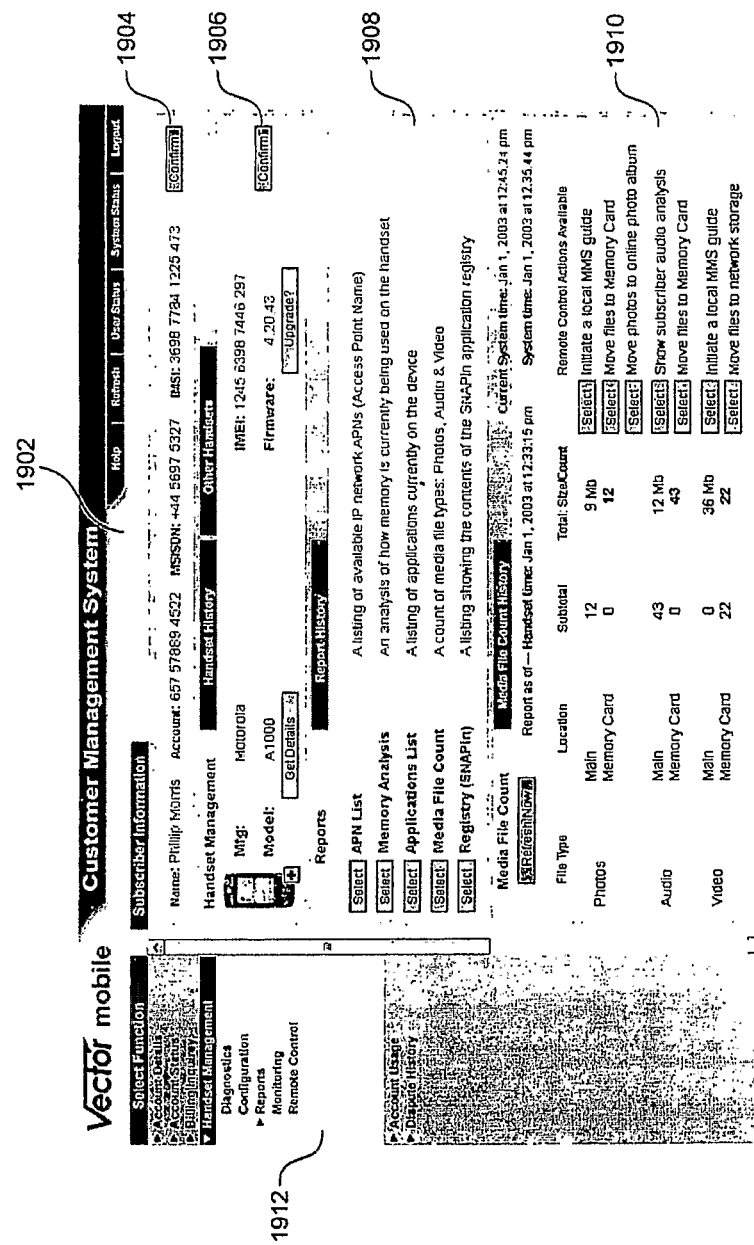
FIG. 19 is a diagram illustrating a display for remotely monitoring and collecting data related to the subscriber's mobile device.

Referring to FIG. 19, an example of a computer display showing device information and configuration data as used by a call center agent is shown. While on a call with a subscriber, the agent can, from his or her desktop computer, send diagnostic commands over the air to the mobile device. In response, the mobile device retrieves or gathers diagnostics and status information and sends them back to the agent's computer, via the network. In this way, agents are able to quickly correct issues on the first call with the subscriber, and the subscriber is never asked to perform tedious tasks or asked to call back on a land line. For instance, network-based services 204 will not need to ask a subscriber to remove their battery to provide mobile device identification data since the data will be reported automatically to the network-based services in real-time.

As can be seen from FIG. 19, the system can automatically display, on a computer to a call center agent, detailed information regarding the mobile device and its owner. A web browser or customer service display 1902 includes a menu of options 1912, report and history portion 1908 (e.g., APN list, memory analysis, applications list, etc.), the name of the mobile device owner, the owner's account number and phone number, MSISDN (Mobile Station Integrated Services Digital Network) number, international mobile subscriber identity (IMSI), and details regarding the phone itself, such as the manufacturer, model number, firmware version, serial number, and IMEI (International Mobile Equipment Identifier). Other tabs, when selected, display the history of the handset, as well as other handsets associated with the subscriber, phone numbers, SIM, etc. As also shown in FIG. 19, the system can display a media file count 1910 representing different types of files (e.g., photos, audio, video), the location of those files, the total number and size of the files, and so forth.

Thus, network-based services 204 may use a standard web browser to interact with reports and to remotely issue commands from the network browser to the mobile device. In this manner, the network-based services 204 or the call center agent can remotely monitor subscriber and mobile device activities, thereby notifying the subscriber when problems occur, rather than when they are reported by the subscriber.

Possibly more importantly, the call center agent, via the system, can initiate actions on the mobile device via his or her computer. For example, as shown in the media display portion 1910, the call center agent may select a "Select" button to perform a "Move files to Memory Card" function that permits the call center agent to move files from the embedded memory on the mobile device to a removable memory card in the device. Other options include initiating a local multimedia messaging service (MMS) guide for the subscriber, moving photos to an online photo album, showing subscriber audio analysis, and so forth. Likewise, the call center agent can select an appropriate button in the report/report history portion 1908 to access a list of available IP network access point names, analyze how memory is currently being used on the mobile device, list applications currently loaded and/or running on the mobile device, count media file types (as shown in portion 1910), and list the content of an application registry for the functionality described above.

Figure 24:
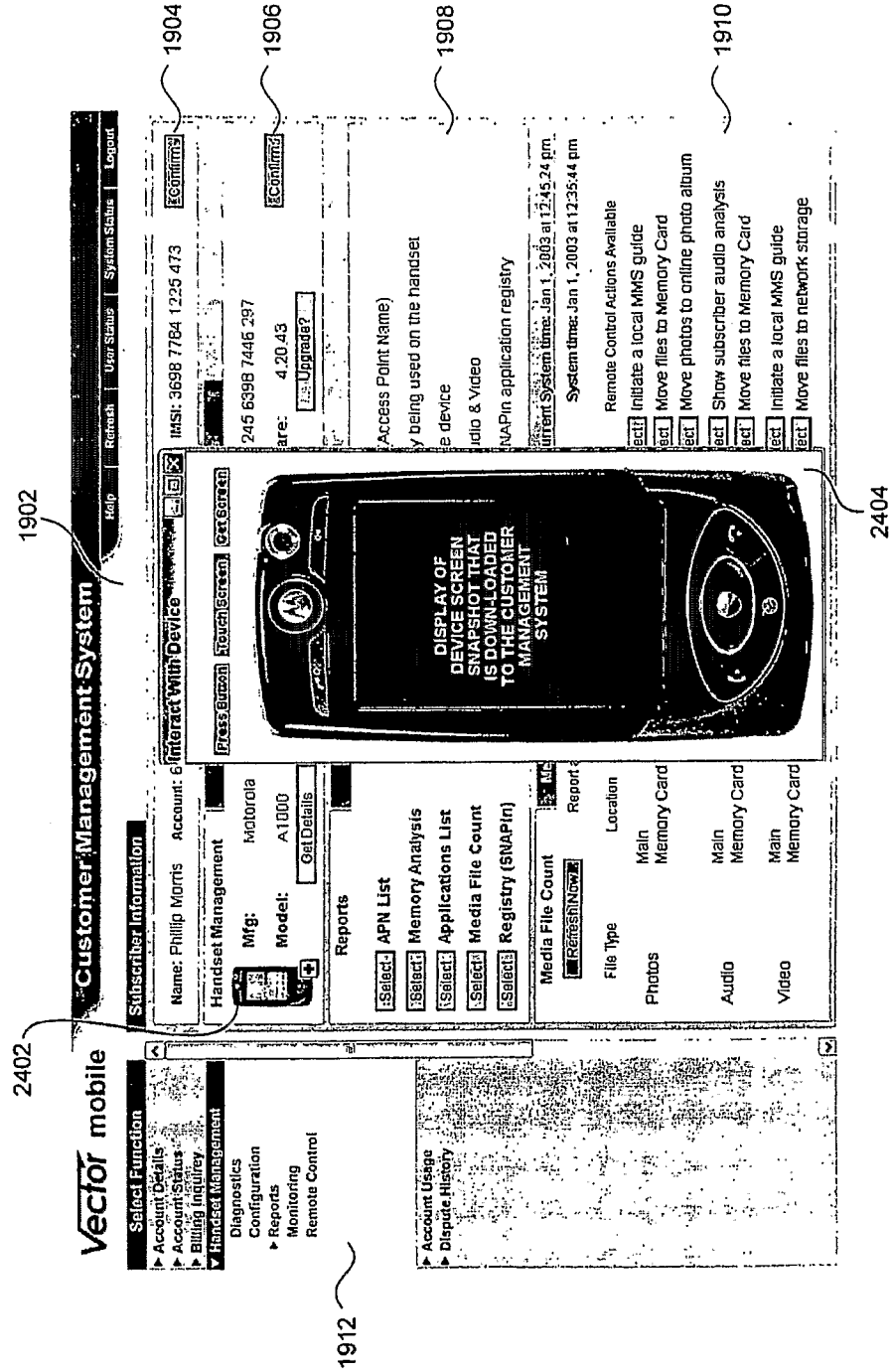
FIG. 24 is a diagram illustrating a display for remotely monitoring and collecting data related to the subscriber's mobile device.

By clicking on a small image 2402 of the mobile device shown in the display 1902, the call center agent's computer displays a pop-up window 2404 featuring an enlarged image of the mobile device that includes current contents of the mobile device's display, as shown in FIG. 24. The call center agent or customer service representative may then interact with the image of the mobile device in the window 2404 to remotely and virtually actuate buttons on the mobile device, including sending touch screen commands to the mobile device if that device has a touch screen. This allows the call center agent to take temporary control of the device for diagnostic or configuration purposes.

Figure 20:
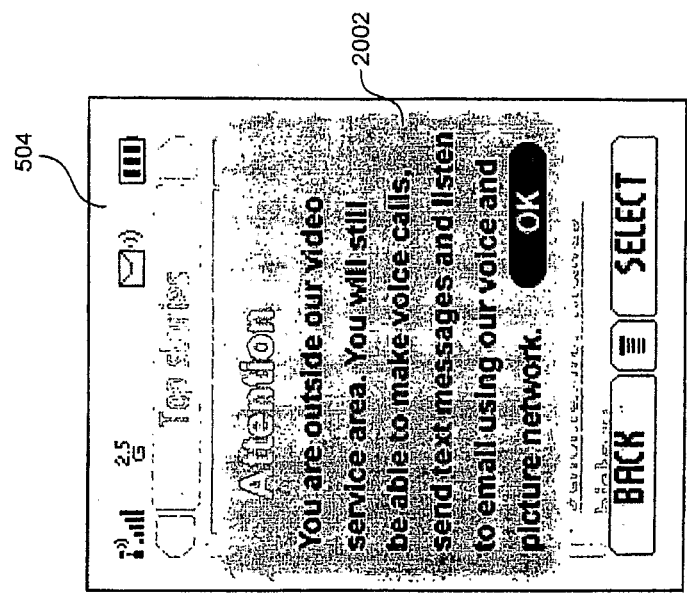
FIG. 20 is a mobile device display screen illustrating a proactive notification message to a subscriber regarding network changes.

One example of remotely initiating actions or providing remote data to the mobile device is found in FIGS. 8A and 8B. Another example is shown in FIG. 20 where the mobile device performs active monitoring of the device itself, via an appropriate script or mobile device application to monitor a change in network availability and status. The device application on the subscriber's mobile device can automatically monitor device settings, configurations, network availability, and network status. The mobile device may thus respond to a network event, such as roaming into a 2.5G type network, which causes a locally stored script to alert the user. In the example of FIG. 20, the mobile device has roamed outside of a video service area, and thus the subscriber cannot send or receive videos. However, a script on the mobile device provides notice to the subscriber indicating that voice calls, text messages, and many other lower bandwidth applications are still available. The mobile device script displays an instructive dialog 2002 on the display 504. Such a helpful message to the subscriber can avoid costly calls to the support center when users may have attempted to send or receive videos outside the service area. The mobile device script may also log and report events or errors. In addition, the mobile device application may also automatically re-configure the mobile device while roaming or may add a new network configuration. (The terms mobile device "script" and "application" may at times be used interchangeably herein, as those skilled in the art will recognize.)

A system including the network-based services 204 and the mobile device 100 may be used to collect and to summarize data or metrics from the mobile device. Mobile device activity can be automatically logged and captured for periodic reporting to the network-based services. Collected data may be used to determine which applications are being used and how often users are accessing them. The collected data can be used with performance engineering systems and can gather business intelligence from rich device resident data or metrics.

The gathering of such mobile device metrics begins by the network operator defining data for collection. All mobile device activities can be locally logged or cached on the mobile device and periodically provided back to the network. Such logged data can include network events and messages. Over-the-air scripts provided by the network operator to the mobile device can instruct the device on what metrics to gather and with what frequency. For example, the service provider may program the mobile device to periodically (e.g. monthly) report to the network a status of installed executable program and their functional status. The status of the executable programs can be performed via an API (application programming interface) function called by the reporting system.

Through these scripts stored on the mobile device, user and network data is stored locally for periodic reporting, and the collection may conform to the network operator's privacy policy, while being invisible to the subscriber. Available database and reporting tools may import and use the periodically reported data. Such reporting tools may generate reports formatted for including business intelligence and data warehouse or data mining. As a result, such data easily augments network performance engineering systems. In general, the following is a list of some metrics that may be collected from mobile devices, although many others are possible: owner information, phone settings, IMEI, battery level, battery level history, % time charger connected, volume level, ring tones, profile use history, number or history of hard resets, count of contacts, installed applications, network settings, signal strength, radio frequency, tower ID, carrier ID, visiting carrier ID, base station history, carrier ID history, phone number, voicemail number, handset ID, camera capable, SIM ID, audio recording capable, screen resolution, screen color depth, operating system (OS) version, date and time, email configuration, hardware make/model, firmware version, audio playback capabilities, language, memory and % memory used, connection state or type of connection used, volume levels, backlight on/off, sound events, profiles, SIM contacts, turn device powered down, device hibernate, security settings, key pad lock, profiles, and SIM lock. Access to any of this data is scriptable so that the network service provider may decide what metrics to gather from what mobile devices. The service provider may also capture activities (e.g., applications started, network status, cell tower ID) and create standardized scriptable functions that can be combined to create a context sensitive service for the user.

The method for intercepting calls at the mobile device 100 may also be applied to locally verify if a subscriber is eligible for a special offer or promotion. FIGS. 21A through 21F illustrate a method for locally verifying on the mobile device if a subscriber is eligible for an advertised promotion. The method begins where a subscriber calls customer support to see if they qualify for an advertised promotion. The mobile device intercepts and redirects the call to the mobile device itself. FIG. 21A shows three icons on the mobile device display corresponding to three different promotions (2102, 2104, and 2106). If the subscriber selects the "NEC 338" icon 2102, then the display may show information regarding the promotion 2108, as well as links to determine if the subscriber qualifies for the promotion 2110 and to the terms and conditions of the promotion 2112 (as shown in FIG. 21B).

If the subscriber selects the Do I Qualify option 2110, the mobile device will locally check to see if the subscriber qualifies for the promotion 2114 or query an appropriate network server if necessary, as shown in FIG. 21C. If the subscriber qualifies for the promotion 2116 (as shown in FIG. 21D), the subscriber may select either to sign up for the promotion 2118 or to not sign up for the promotion 2120. If the subscriber chooses to sign up for the promotion 2118, then the mobile device prompts the subscriber (2122) to enter the subscriber's PIN number (2124), as shown in FIG. 21E. If the correct PIN number is entered, then the mobile device prompts the subscriber to select a payment option 2126 by selecting either "yes" 2130 or "no" 2132, as shown in FIG. 21F. In addition, a link to the terms and conditions 2128 is provided on the display.

As noted above, the method for intercepting calls may also be applied to a variety of processes and applications located at a mobile device 100. In some embodiments, the method may intercept any type of user input noted above, such as any text-based messages, including not only email and SMS, but also instant messaging (IM) and multimedia messaging (MMS), among others. For example, with 1M, instant messages are received from instant messaging applications located at the mobile device 100. After a subscriber launches an instant messaging application, he or she may create or input a "611", "help" or other recognizable IM address. Software on the mobile device may determine whether the address corresponds to one of the predetermined addresses (such as a customer support address). For example, if the address matches a customer support service address (such as "611"), then the mobile device may interrupt the attempted message and return an instant message with a list of potential solutions to the subscriber's problems on the mobile device as noted above.

Figure 27:
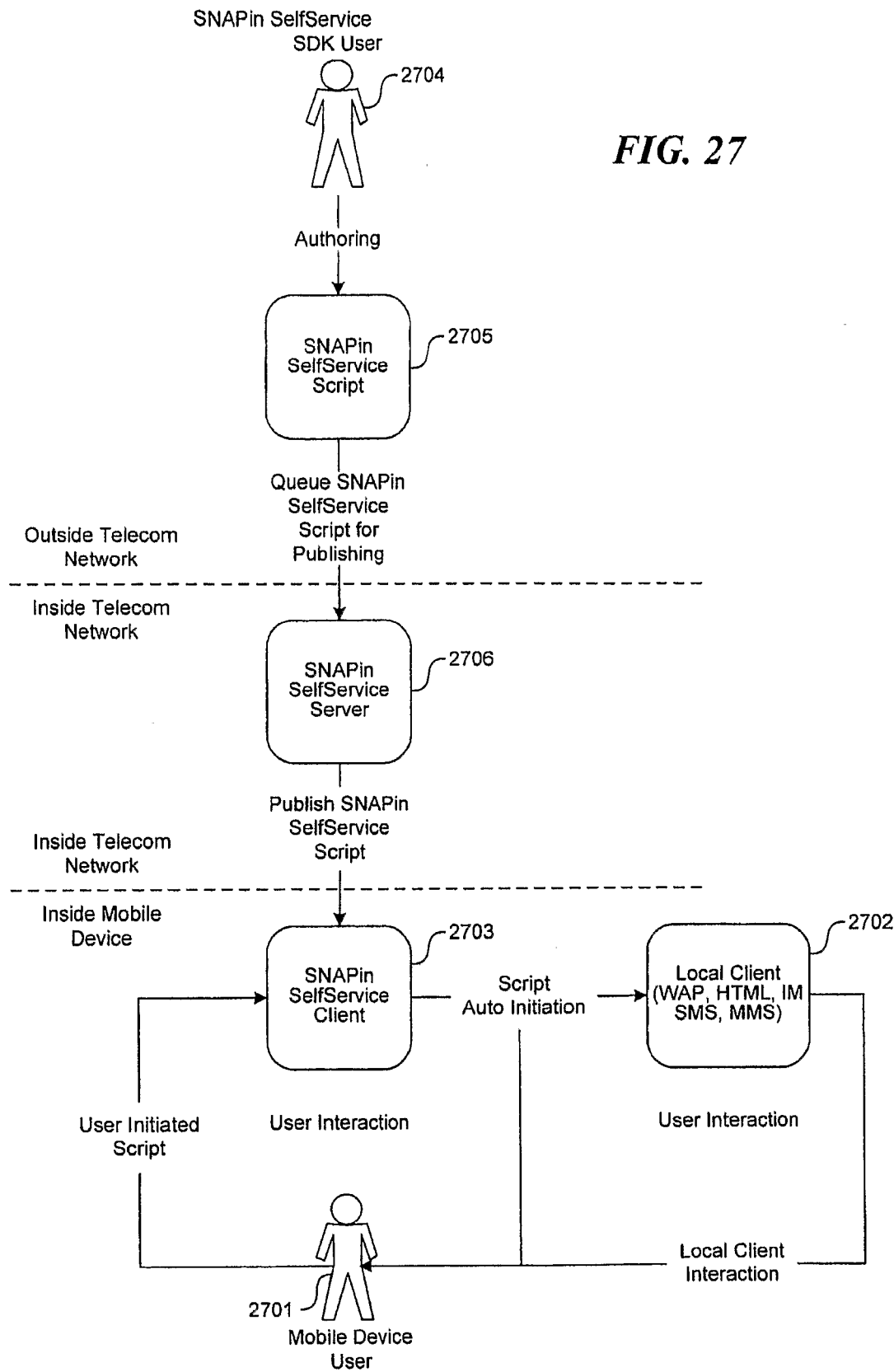
FIG. 27 illustrates a routine for intercepting and responding to an instant message at the mobile device.

FIG. 27 illustrates a routine for intercepting and responding to an instant message at the mobile device. A subscriber 2701 launches an instant messaging application 2702 and enters an instant message to be sent to a customer service support address, such as "611" or "support" to access a customer support center The subscriber's mobile device determines locally (via a local client 2703) if the address of the message is an address stored on the mobile device. If the address matches, then the mobile device locally intercepts the instant message at the mobile device and performs actions at the mobile device, as described below. In some embodiments, the mobile device may intercept the instant message and display locally stored content (e.g., series of help screens), or launch a browser to a predetermined webpage via a network connection. In some embodiments, the mobile device may intercept the instant message and deploy an automated messaging system (such as a "bot").

The bot may receive instant messages and send reply messages to the subscriber in order to determine a solution for the subscriber. For example, the subscriber sends an instant message (such as "How do I send pics?") to the address "support." The bot returns a message asking for more details, such as "Via SMS, email, or other?" The subscriber replies with "SMS." The bot may then display instructions within the text messaging application on how to send pictures using SMS, or enable the system to launch other methods to display similar instructions to a subscriber, as discussed herein.

If the number does not match, then the mobile device allows the instant message to be transmitted to the destination address, or alternatively, to another bot located at a system server (described below).

In some embodiments, the system may intercept a subscriber initiated instant message at a system server location. For example, the system may receive and intercept an instant message associated with a query for a subscriber's billing information (or other information not necessarily provided at the mobile device 100) at the server, since the information requested by the subscriber may not be provided by the local client at the mobile device 100.

As shown in FIG. 27, if the mobile device lacks any such local client script 2705, this local client script may be authored by a developer 2704 using, for example, a software development kit (SDK) for scripting the desired functionality. The authored script 2705 may then be uploaded or published to a server, such as a server 2706 in the telecommunications network. The script may then be automatically downloaded to the mobile device 100 when it may be automatically initiated as the local client 2703.

Figure 28:
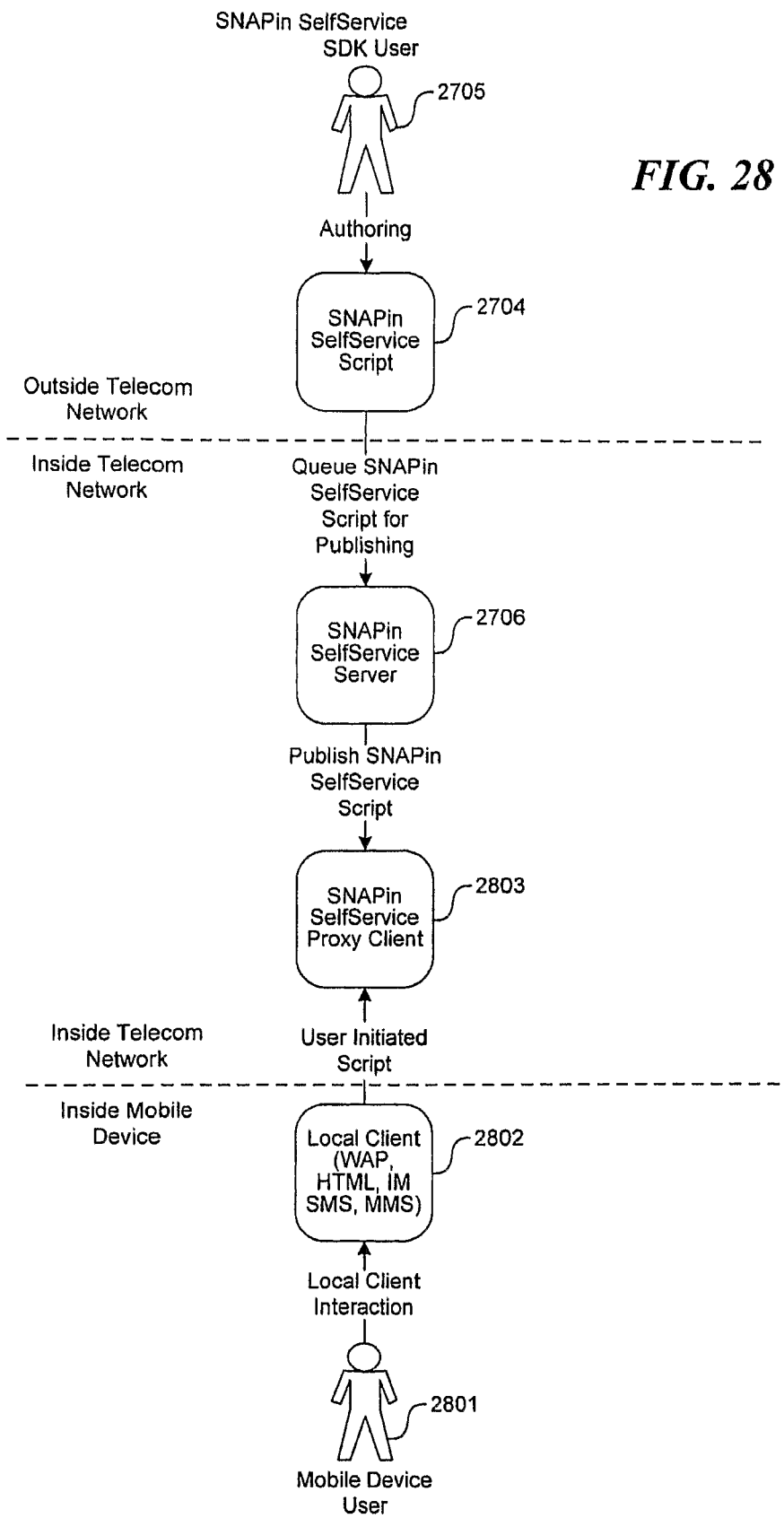
FIG. 28 illustrates a routine for intercepting and responding to an instant message at a system server remote from the mobile device.

FIG. 28 illustrates a routine for intercepting and responding to an instant message at a system server remote from the mobile device. A subscriber 2801 launches an instant messaging application 2802 and enters an instant message to be sent to a service provider address to access subscription information related to the subscriber (such as the subscriber's billing information). If the address does not match the addresses stored at the mobile device 100, the instant message bypasses the system's local client (such as the client 2703 described with respect to FIG. 27) and determines remotely (e.g., at a system server 2803) if the address matches an address stored in the system. If the number matches, then the mobile device remotely intercepts the instant message at the server 2803 and performs actions with an automated response system (or "bot") as described below. The bot may be a proxy client located at the system server, and may access information through a proxy connection to the service provider. The bot may return an instant message to the subscriber (such as "Welcome, How can I help you?") The user may send a return message of "What is my billing information?" The bot may then reply with the subscriber's billing information, such as:
"Your current billing for 206-555-1212
Info as of 01-01-2005
Voice minutes: 200
Data minutes: 600
SMS used: 124
The subscriber may end with a message that terminates the instant messaging session, such as "Bye" or "Thanks," or may simply end the session by closing the instant messaging application.

Also, if the mobile device 100 lacks any such local client script 2705, this local client script may be authored by a developer 2704 using, for example, a software development kit (SDK) for scripting the desired functionality. The authored script 2705 may then be uploaded or published to a server, such as a server 2706 in the telecommunications network.

As can be seen, aspects of the invention permit a wireless service provider to move call support functions from a call center to the mobile device itself. The wireless service provider can monitor call center activities and identify those subscriber inquiries that currently consume the largest amount of call center time, and move such calls to be handled on the device itself (where appropriate). As noted above, many such customer support calls can be handled on the device, such as technical support questions, questions regarding whether a subscriber is eligible for a promotion, billing inquiries, and so forth. Thus, the customer self-support screens and functions stored locally on the mobile device, links or data displayed in an initial screen on the device (e.g., billing information), and so forth, can change dynamically, so that the wireless service provider updates the customer self-support features on the mobile device to accommodate those calls that currently consume the largest amount of call center time.

The customer self-support features are not limited to mobile devices, as noted above. Such features can apply to any remote device, including consumer appliances such as refrigerators, dishwashers, washers/dryers, ovens, and so forth. With any of such appliances having computing capabilities (and/or connection to the internet), such devices can locally store information and provide the functionality described above to handle customer inquiries that previously had been handled by a call center or web site accessed by the consumer via another device, such as the consumer's computer.

Thus, in an alternate embodiment, a mobile device may use a Bluetooth or other wireless protocol link to communicate with the household appliances. For example, a Bluetooth link between a refrigerator and a mobile device may allow the mobile device to automatically detect a drop in the temperature of the refrigerator. Upon automatic detection, the mobile device may alert the user regarding the drop in temperature. Using the mobile device as an interface, the user may find information to address the drop in temperature on the mobile device itself, may download information from a network, or may call a customer support center for the specific appliance.

Figure 22:
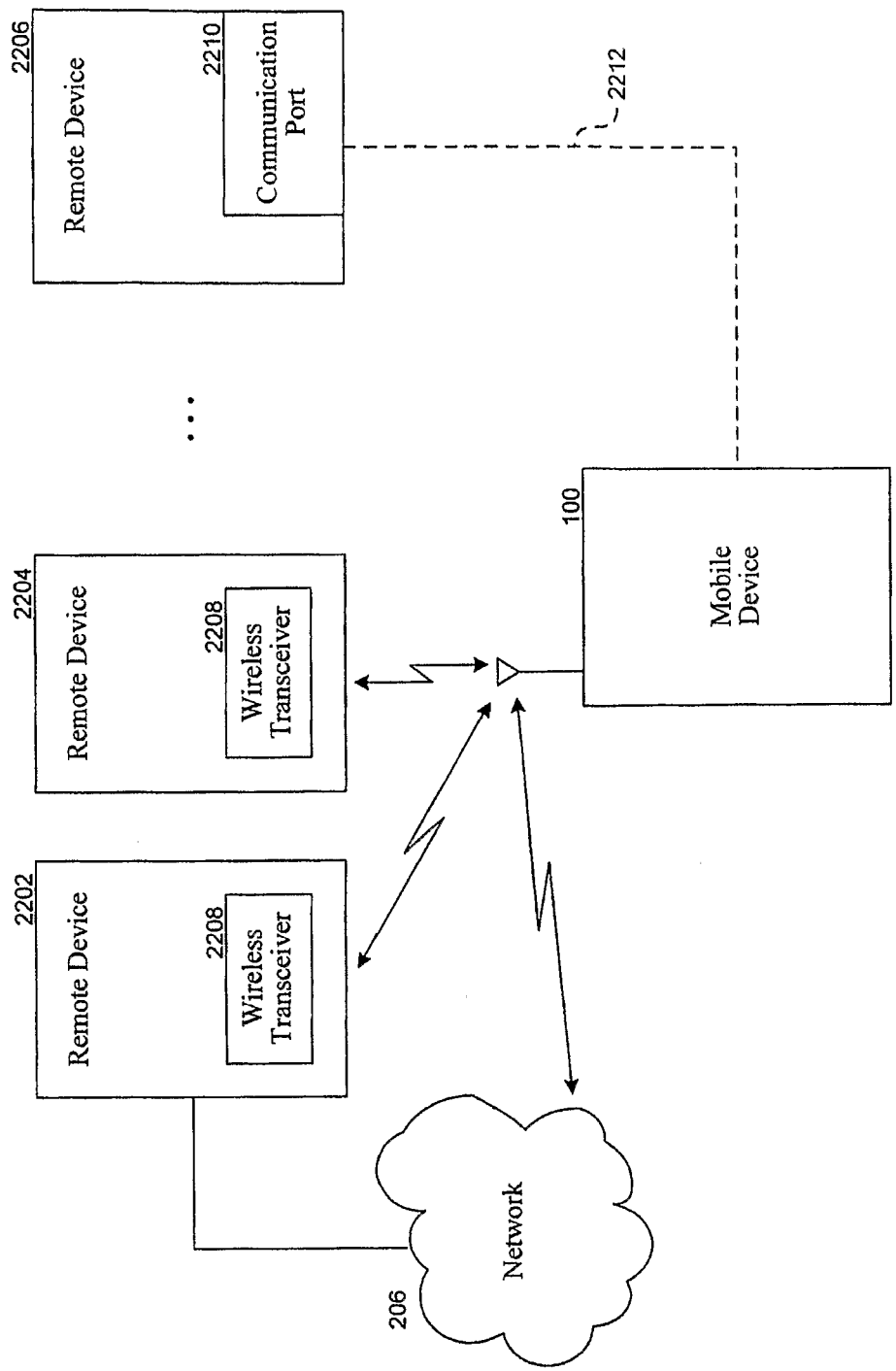
FIG. 22 is a block diagram illustrating an alternative embodiment where the mobile device communicates with remote devices.

Referring to FIG. 22, an example of an alternative embodiment is shown where the mobile device 100 communicates with multiple remote devices 2202, 2204, and 2206. Remote devices 2202 and 2204 each include a wireless transceiver 2208 that communicates with the mobile device 100, such as via a Bluetooth link, IEEE 802.11, or other short-range wireless link. The mobile device may communicate with the remote device 2206 via a wired communication port 2210 that the mobile device can be physically coupled to at the subscriber's option. (As also shown, the remote device 2202 includes a wired connection to the network 206.) Thus, the mobile device may be a central communicator within a subscriber's home or other location, where the mobile device receives alerts from the remote devices, provides instructions or steps to the subscriber, allows the subscriber to query a status of remote devices, allows the subscriber to send commands to or operate the remote devices, and so forth. While a local wireless link is described above, the mobile device may be capable of remotely querying and controlling the remote devices via other connections, such as via the network 206 to control the remote device 2202, or via a longer range wireless link, such as a WAN, satellite link, and so forth.

As noted above, each remote device may include the customer self-support functionality described herein. Further, since some remote devices may lack a sufficient display screen or other user interface, the remote device may communicate with the mobile device so that the mobile device operates as a more robust user interface for that remote device. Thus, consumers may receive instruction screens from an appliance, and provide commands to that appliance, through the mobile device.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

Further, the mobile device may employ many other locally stored applications beyond those described above. For example, the mobile device may include its own IVR system, rather than employing an IVR system at the call center. Thus, the subscriber navigates through a series of IVR menus to access desired information, some of which may be stored on the phone. However, one option in the local IVR could be to have the device place a call to the customer support call center.

In another alternative embodiment, the system may provide links to web pages supplied by the wireless service provider, where these links are to specific web pages directly addressing a need or question relevant to a current status of a user's mobile device. Such an alternative is useful when a mobile device has a web browser and sufficient data connection to the service provider's web server. Thus, a call intercept function on the mobile device may provide a link to a relevant web page, or even access that page automatically so that it is displayed to the user (rather than, for example, displaying locally stored content).

While many embodiments described above employ software stored on the mobile device (either before being given to a subscriber, or during a subscriber call), the scripts and other software noted above may be hard coded into the mobile device (e.g. stored in EEPROM, PROM, etc.). Further, the above functionality may be implemented without scripts or other special modules.

The teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated by reference. Aspects of the invention can be modified, if necessary, to employ the systems, functions, and concepts of the various references described above to provide yet further embodiments of the invention.

These and other changes can be made to the invention in light of the above Detailed Description. While the above description details certain embodiments of the invention and describes the best mode contemplated, no matter how detailed the above appears in text, the invention can be practiced in many ways. Details of the local-based support system may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

We claim:

1. A method of intercepting a text message initiated by a user with a mobile device, wherein the mobile device is communicatively coupled to a wireless cellular telephone network, the method comprising:
   determining that the user has initiated a transmission of a text message to a party having an electronic address,
      wherein the text message is directed to the electronic address,
      wherein the electronic address is a phone number or other electronic identifier to identify the party or a communication device of the party,
      wherein the text message is directed to the party via, at least in part, the wireless cellular telephone network, and
      wherein the determining that the user has initiated the transmission of the text message is performed on the mobile device of the user;
   matching the electronic address to one or more predetermined addresses related to at least one action to be performed on the mobile device,
      wherein the matching of the electronic address to one or more predetermined addresses is performed on the mobile device from which the text message transmission was initiated;
   locally performing the at least one action related to the matched predetermined address,
      wherein the locally performing the at least one action is performed on the mobile device from which the text message transmission was initiated; and
   preventing the transmission of the text message to the party.

2. The method of claim 1, wherein the matching comprises comparing the address to one or more predetermined addresses stored locally at the mobile device.

3. The method of claim 1, wherein the matching comprises comparing the address to which the text message was directed to one or more predetermined addresses stored at a network server related to the mobile device.

4. The method of claim 1, wherein performing an action comprises transmitting a text message to the user.

5. The method of claim 1, wherein performing an action comprises displaying locally stored content to the user.

6. The method of claim 1, wherein performing an action comprises launching a browser to display a predetermined webpage to the user.

7. The method of claim 1, wherein performing an action comprises invoking an automated messaging system, wherein the automated messaging system includes a bot stored locally at the mobile device to automatically interact with the user via messages displayed to the user of the mobile device.

8. The method of claim 1, wherein performing an action comprises invoking a bot stored at a network server to interact with the user.

9. The method of claim 1, wherein the locally performing at least one action includes executing a script locally stored on the mobile device,
   wherein the script is authored and uploaded or published to a network server in the wireless cellular telephone network, and
   wherein the script is automatically downloaded from the network server to the mobile device to be automatically initiated at the mobile device.

10. A system for providing customer support to a user of a mobile device, the system comprising:
   at least one memory of the mobile device;
   a message intercept component that intercepts a message sent by the user of the mobile device when the message contains an electronic destination address that matches one or more predetermined addresses related to customer support,
    wherein the electronic destination address is a phone number or other electronic identifier to identify the customer support party or a communication device of the customer support party,
    wherein the matching is performed at the mobile device from which the user sent the message, or at a network server related to the mobile device from which the user sent the message, and
    wherein the interception includes preventing the transmission of the message to the customer support party;
a script component that, in response to a matched address, launches a script on the mobile device to perform an action on the mobile device from which the user sent the message,
    wherein the script component is stored in the at least one memory of the mobile device, and
    wherein the script component is executed on the mobile device; and
an action component that, in response to the launched script, performs the action on the mobile device from which the user sent the message,
    wherein the action component is communicatively coupled to the script component,
    wherein the action component is stored in the at least one memory of the mobile device, and
    wherein the action component is executed on the mobile device.

11. The system of claim 10, wherein the message intercept component, the script component, the script, and the action component are stored at the mobile device.

12. The system of claim 10, wherein the message intercept component is stored at the network server related to the mobile device.

13. The system of claim 10, wherein the message intercept component intercepts an email message sent by the user.

14. The system of claim 10, wherein the message intercept component intercepts an instant message sent by the user.

15. The system of claim 10, wherein the message intercept component intercepts a Short Message Service (SMS) message sent by the user.

16. The system of claim 10, wherein the destination address of the message is 611.

17. The system of claim 10, wherein the destination address of the message is related to a customer support address of a service provider.

18. The system of claim 10, wherein the destination address of the message is related to billing inquiries.

19. The system of claim 10, wherein the performed action comprises launching an automated messaging system, wherein the automated messaging system includes a bot that receives messages from the user and automatically returns messages to the user to be displayed to the user of the mobile device.

20. The system of claim 10, wherein the performed action comprises displaying help instructions to the user.

21. The system of claim 10, wherein the performed action comprises displaying user account information to the user.

22. The system of claim 10, wherein the performed action comprises launching a browser and directing the user to a predetermined webpage associated with a service provider.

23. The system of claim 10, wherein the script is authored and uploaded or published to a network server in a wireless cellular telephone network, and
    wherein the script is automatically downloaded from the network server to the mobile device to be automatically initiated at the mobile device.

24. A non-transitory computer-readable medium containing instructions for performing a method of intercepting a text message initiated by a user with a mobile device, the mobile device being communicatively coupled to a wireless cellular telephone network, wherein the method comprises:
    determining that the user has initiated a transmission of a text message to a party having an electronic address,
        wherein the text message is directed to the electronic address,
        wherein the electronic address is a phone number or other electronic identifier to identify the party or a communication device of the party,
        wherein the text message is directed to the party via, at least in part, the wireless cellular telephone network, and
        wherein the determining that the user has initiated the transmission of the text message is performed on the mobile device of the user;
    matching the electronic address to one or more predetermined addresses related to at least one action to be performed on the mobile device,
        wherein the matching of the electronic address to one or more predetermined addresses is performed on the mobile device from which the text message transmission was initiated;
    locally performing the at least one action related to the matched predetermined address,
        wherein the locally performing the at least one action is performed on the mobile device from which the text message transmission was initiated; and
    preventing the transmission of the text message to the party.

25. The non-transitory computer-readable medium of claim 24, wherein the method intercepts an email message sent by the user.

26. The non-transitory computer-readable medium of claim 24, wherein the method intercepts an instant message sent by the user.

27. The non-transitory computer-readable medium of claim 24, wherein the electronic address is a Short Message Service (SMS) address.

28. The non-transitory computer-readable medium of claim 24, wherein the electronic address is a Multimedia Messaging Service (MMS) address.

\* \* \* \* \*

UNITED STATES PATENT AND TRADEMARK OFFICE
CERTIFICATE OF CORRECTION

PATENT NO.       : 8,682,298 B2                                                      Page 1 of 1
APPLICATION NO. : 12/089690
DATED            : March 25, 2014
INVENTOR(S)      : Roundtree et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 851 days.

Signed and Sealed this
Twenty-ninth Day of September, 2015

Michelle K. Lee
*Director of the United States Patent and Trademark Office*